(12) United States Patent
Yoo et al.

(10) Patent No.: US 10,270,762 B2
(45) Date of Patent: Apr. 23, 2019

(54) USER AUTHENTICATION METHOD FOR ENHANCING INTEGRITY AND SECURITY

(71) Applicant: SSENSTONE INC., Seoul (KR)

(72) Inventors: Chang Hun Yoo, Seoul (KR); Un Yeong Heo, Anyang-si (KR); Min Gyu Kim, Seoul (KR); Woo Yong Seo, Seoul (KR)

(73) Assignee: SSenStone Inc., Seoul (KR)

( * ) Notice: Subject to any disclaimer, the term of this patent is extended or adjusted under 35 U.S.C. 154(b) by 107 days.

(21) Appl. No.: 15/462,911

(22) Filed: Mar. 20, 2017

(65) Prior Publication Data
US 2017/0318011 A1    Nov. 2, 2017

Related U.S. Application Data

(63) Continuation of application No. PCT/KR2016/005008, filed on May 12, 2016.

(30) Foreign Application Priority Data

Apr. 28, 2016   (KR) .................. 10-2016-0052423

(51) Int. Cl.
 *H04L 29/06* (2006.01)
 *H04L 9/08* (2006.01)
(52) U.S. Cl.
 CPC ........ *H04L 63/0838* (2013.01); *H04L 9/0822* (2013.01); *H04L 63/0428* (2013.01); *H04L 63/0876* (2013.01); *H04L 63/123* (2013.01)
(58) Field of Classification Search
 CPC ............. H04L 63/0838; H04L 63/0876; H04L 63/0428; H04L 63/123; H04L 9/0822
 See application file for complete search history.

(56) References Cited

U.S. PATENT DOCUMENTS

| | | | | |
|---|---|---|---|---|
| 2006/0136739 A1* | 6/2006 | Brock | .................. | G06Q 20/322 713/184 |
| 2009/0185687 A1* | 7/2009 | Wankmueller | ........ | H04L 9/3273 380/277 |

(Continued)

FOREIGN PATENT DOCUMENTS

KR    10-1270941 B1    6/2013

*Primary Examiner* — Brandon S Hoffman
*Assistant Examiner* — William A Corum, Jr.
(74) *Attorney, Agent, or Firm* — Studebaker & Brackett PC

(57) ABSTRACT

Disclosed is a user authentication method including at least: (1) performing a primary conversion to generate a first common authentication key and performing a secondary conversion to provide an encrypted first common authentication key, and registering the encrypted first common authentication key; (2) generating a first server authentication key, and performing an OTP operation on the first server authentication key to generate first server authentication information; (3) performing a primary conversion to generate a second common authentication key, performing a secondary conversion to generate an encrypted second common authentication key, generating a first user authentication key, and performing an OTP operation on the first user authentication key to generate first user authentication information; and (4) performing a user authentication or an authentication of the authentication server for determining a genuineness of the authentication server, based on coincidence of the first server authentication information and the first user authentication information.

26 Claims, 14 Drawing Sheets

(56) References Cited

U.S. PATENT DOCUMENTS

| | | | | |
|---|---|---|---|---|
| 2010/0180328 A1* | 7/2010 | Moas | ............... | G06F 21/34 726/6 |
| 2014/0120905 A1* | 5/2014 | Kim | ............... | H04W 12/06 455/426.1 |
| 2015/0381621 A1* | 12/2015 | Innes | ............... | G06F 21/31 726/7 |

* cited by examiner

USER AUTHENTICATION METHOD FOR ENHANCING INTEGRITY AND SECURITY

CROSS-REFERENCE TO RELATED APPLICATIONS

The present application is a continuation of International Patent Application No. PCT/KR2016/005008, filed May 12, 2016, which is based upon and claims the benefit of priority to Korea Patent Application No. 10-2016-0052423, filed on Apr. 28, 2016. The disclosures of the above-listed applications are hereby incorporated by reference herein in their entirety.

BACKGROUND

Embodiments of the inventive concept described herein relate to a user authentication method for enhancing integrity and security, and more particularly, to a user authentication method for enhancing integrity and security by blocking any attempt to leak personal information on an open network, by preventing hacking to enhance security, and by verifying integrity of transmission data.

In the modern society, financial trades or business that requires various user authentications is made through online environments rather than through face-to-face contacts. As the online user authentications require more prudent approaches than in the case of the face-to-face contacts, it is necessary to install various security programs or control programs, including ActiveX and keyboard security programs, in the user terminals, and leakage of information is prevented by enhancing security through a certificate of authentication, a security card, or a security device, such as a one-time password (OTP) device.

According to a method using an OTP device that corresponds to one of representative user authentication methods, the OTP device having a unique key therein is provided to a user in advance, an OTP number is generated based on random numbers associated with a current time while the unique key functions as an operation key when the user access a financial trade network to request an authentication from an authentication server (a server of a financial institute), and the user authenticates that he or she is a genuine user by manually inputting the generated OTP number as a password and transmitting the input password to the authentication server.

However, when a user does business with a plurality of financial institutes, he or she has to have a plurality of OTP authentication devices provided by the financial institutes, respectively, and accordingly, the consumer has to purchase the OTP authentication devices for the financial institutes, respectively, has to carry the plurality of OTP authentication devices, and has to search for an authentication device for a specific financial institute, from the plurality of OTP authentication devices.

Further, because the unique key of the OTP device cannot be arbitrarily replaced by the user, the user has to visit a financial institute to receive a new OTP device when he or she loses the OTP device. Further, when the unique keys of the OTP devices of the clients are leaked, the financial institute has to consume enormous costs and time, for example, to reissue the OTP devices to all the clients.

Meanwhile, the user performs an authentication or a login through a specific password, the related server has to register, store, and manage the password of the user and the user has to perceive the password and regularly change the password against a leakage of the password, which makes the management of the password difficult.

Moreover, due to the development of the hacking technologies, because information, such as a certificate of authentication or a password is leaked in various routes, including a screen capture, a shoulder surfing attack, a screen hacking technology such as screen monitoring, or spyware installed in a PC and a professional hacker may decrypt an encoded password with a degree of effort, it is necessary to enhance security while guaranteeing convenience of user in a procedure for authentication of a user. Further, it is necessary to enhance integrity by verifying errors in a transmission process.

PRIOR TECHNICAL DOCUMENTS

Patent Documents (Patent Document 1) Korean Patent No. 10-1270941 (May 29, 2013)

SUMMARY

Embodiments of the inventive concept provide a user authentication method for enhancing integrity and security.

Embodiments of the inventive concept also provide a user authentication method for enhancing integrity and security, by which a simple user authentication procedure may be made while the security thereof is enhanced, and the integrity of the user authentication may be verified.

Embodiments of the inventive concept also provide a user authentication method for enhancing integrity and security, which may be conveniently applied even to an open network environment without causing a danger of leaking information.

Embodiments of the inventive concept also provide a user authentication method for enhancing integrity and security, by which a user may determine genuineness of an authentication institute or an authentication server for authentication.

Embodiments of the inventive concept also provide a user authentication method for enhancing integrity and security, which allows an authentication institute or an authentication server to perform an authentication without managing the password of a user and uses multiple factors associated with time.

In accordance with an aspect of the inventive concept, there is provided a user authentication method using a user terminal and an authentication server, the user authentication method including (1) if a personal password for registration of a user is input by the user, combining the personal password and a mechanical unique key of the user terminal, performing a primary conversion using a unidirectional function, and generating a first common authentication key, and performing a secondary conversion of encrypting the first common authentication key by using an encryption key and providing the encrypted first common authentication key to the authentication server, by the user terminal, and matching the encrypted first common authentication key with user information and registering the encrypted first common authentication key, by the authentication server, (2) performing a conversion using a unidirectional function while an embedded unique key of an authentication institute and the encrypted first common authentication key are taken as elements and generating a first server authentication key, and performing an one-time password (OTP) operation on the first server authentication key or a second server authentication key that is a converted value of the first server authentication key and generating first server authentication information, by the authentication server, (3) if the personal password is input by the user for authentication, combining the personal password and the mechanical unique key of the user terminal, performing a primary conversion using a unidirectional function, generating a second common authentication key in real time, performing a secondary conversion of encrypting the second common authentication key by using the encryption key, and generating an encrypted second common authentication key, performing a conversion using a unidirectional function while the unique key of the authentication institute provided by the authentication server in advance and the encrypted second common authentication key are taken as elements and generating a first user authentication key, and performing an OTP operation on the first user authentication key or a second user authentication key that is a converted value or the first user authentication key and generating first user authentication information, by the user terminal, and (4) performing a user authentication or an authentication of the authentication server for determining a genuineness of the authentication server, based on whether the first server authentication information and the first user authentication information coincide with each other.

A unique key of a dedicated application program installed in the user terminal may be added to the first common authentication key or the second common authentication key as an element.

(4) may include comparing the first user authentication information and the first server authentication information transmitted from the authentication server and determining a genuineness of the authentication server, by the user terminal, or comparing the first server authentication information and the first user authentication information transmitted from the user terminal and performing the user authentication, by the authentication server.

(2) may include performing a conversion using a unidirectional function while the embedded unique key of the authentication institute and the encrypted first common authentication key are taken as elements, and generating the first server authentication key, by the authentication server, generating a second server authentication key that is extracted from the first server authentication key through a time extraction value generator by using time information by a specific reference, by the authentication server, and performing an OTP operation on the second server authentication key and generating the first server authentication information, by the authentication server, and (3) may include if the encrypted second common authentication key is generated, performing a conversion using a unidirectional function when the unique key of the authentication institute provided by the authentication server in advance and the encrypted second common authentication key are taken as elements, and generating the first user authentication key, by the user terminal, generating a second user authentication key that is extracted from the first user authentication key through a time extraction value generator by using time information by a specific reference, and performing an OTP operation on the second user authentication key and generating the first user authentication information, by the user terminal.

The user authentication method may further include, between (3) and (4), or after (4), performing a conversion using a unidirectional function while a second common authentication key decrypted by using a decryption key or the unencrypted second common authentication key, and the first server authentication information transmitted from the authentication server or the first user authentication information is taken as an element, and generating a third user authentication key, by the user terminal, performing an OTP operation on the third user authentication key and generate a second user authentication information, by the user terminal, transmitting the second user authentication information and the decryption key to the authentication server, by the user terminal, decrypting the encrypted first common authentication key to a first common authentication key by using the decryption key, performing a conversion using a unidirectional function while the first common authentication key and the first user authentication information transmitted from the user terminal or the first server authentication information are taken as elements to generate a third server authentication key, by the authentication server, and performing an OTP operation on the third server authentication key and generating a second server authentication information, by the authentication server, and the method further includes, after (4), determining whether the second user authentication information and the second server authentication information coincide with each other and performing a user authentication.

The user authentication method may further include, between (3) and (4), or after (4), performing a conversion using a unidirectional function while a second common authentication key decrypted by using a decryption key or the unencrypted second common authentication key, and the first server authentication information transmitted from the authentication server or the first user authentication information is taken as element, and generating a third user authentication key, by the user terminal, generating a fourth user authentication key that is extracted from the third user authentication key through a time extraction value generator by using time information by a specific reference, by the user terminal, and performing an OTP operation on the fourth user authentication key and generating a second user authentication information, the method further includes transmitting the second user authentication information and the decryption key to the authentication server, by the user terminal, decrypting the encrypted first common authentication key to a first common authentication key by using the decryption key, performing a conversion using a unidirectional function while the first user authentication information transmitted from the user terminal or the first server authentication information and the first common authentication key are taken as elements to generate a third server authentication key, by the authentication server, and generating a fourth server authentication key that is extracted from the third server authentication key through a time extraction value generator by a specific reference by using time information, by the authentication server, and performing an OTP operation on the fourth server authentication key and generating a second server authentication information, the method may further include, after (4), determining whether the second user authentication information and the second server authentication information coincide with each other and performing a user authentication.

(3) may further include measuring a gap time value that is a time value that is obtained by measuring a time consumed to input a personal password for authentication by the user in unit of 1/n (n is a positive real number) seconds and transmitting the gap time value to the authentication server, by the user terminal, when the third user authentication key is generated by the user terminal, the gap time value or a gap time key that is a number value extracted from the gap time value by a specific reference may be added as an element, and when the authentication server generates the third server authentication key, the time gap value or the gap time key may be added as an element.

(3) may further include measuring a gap time value that is a time value that is obtained by measuring a time consumed to input a personal password for authentication by the user in unit of 1/n (n is a positive real number) seconds and transmitting the gap time value to the authentication server, by the user terminal, when the third user authentication key is generated by the user terminal, the gap time value or a gap time key that is a number value extracted from the gap time value by a specific reference may be added as an element, and when the authentication server generates the third server authentication key, the gap time value or the gap time key may be added as an element.

The unidirectional function may include a hash function as a function for mapping data having an arbitrary length to data of a fixed length, and a symmetrical key encryption scheme in which an encryption key and a decryption key are the same may be used in the encryption for the secondary conversion.

A verification key for verifying integrity of data may be added to transmission target data including authentication information or an authentication key transmitted from the user terminal or the authentication server and is transmitted, a first OTP operation value, which was obtained by performing OTP operations on the transmission target data may be added to the verification key, and when the user terminal or the authentication server receives the data, the integrity of the authentication may be verified by comparing a second OTP operation value, which was obtained by performing OTP operations on the received data, and the verification key.

The authentication server may request an additional manual input of the second user authentication information from the user terminal when a plurality of first server authentication information is transmitted in a specific time, and may compare the manually input second user authentication information and the second server authentication information and may perform a user authentication if the second user authentication information is transmitted through a manual input.

The user authentication method may further include requesting a third user authentication information from the user terminal, by the authentication server, and if the third user authentication information is transmitted through the user terminal, determining whether the third user authentication information and the third server authentication information coincide with each other and performing a user authentication, by the authentication server, the third user authentication information may be generated by performing a conversion using a unidirectional function while the unique key of the authentication institute and the fourth user authentication key are taken as elements to generate a fifth user authentication key, and performing an OTP operation on the fifth user authentication key, by the user terminal, and the third server authentication information may be generated by performing a conversion using a unidirectional function while the unique key of the authentication institute and the fourth server authentication key are taken as elements to generate a fifth server authentication key, and performing an OTP operation on the fifth server authentication key, by the authentication server.

The user authentication method may further include the user terminal detects a symptom of an attack including hacking while the authentication procedure of (1) to (4) is performed, and compulsorily stops the authentication procedure by generating a compulsory stop signal for compulsorily stopping the authentication procedure and transmitting the compulsory stop signal to the authentication server when the symptom of an attack is detected.

In accordance with another aspect of the inventive concept, there is provided a user authentication method using a user terminal and an authentication server, the user authentication method including (1) if a procedure for registration of a user is started by a user, performing a primary conversion using a unidirectional function while a mechanical unique key of the user terminal is taken as an element and generating a first common authentication key, and performing a second conversion of encrypting the first common authentication key and providing the encrypted first common authentication key to the authentication server, by the user terminal, and matching the encrypted first common authentication key with user information to register the encrypted first common authentication key, by the authentication server, (2) performing a conversion using a unidirectional function while an embedded unique key of an authentication institute and the encrypted first common authentication key are taken as elements and generating a first server authentication key, and performing an OTP operation on the first server authentication key or a second server authentication key that is a converted value of the first server authentication key and generating first server authentication information, by the authentication server, (3) if an authentication procedure is started by the user for authentication, performing a primary conversion using a unidirectional function while a mechanical unique key of the user terminal is taken as an element, generating a second common authentication key in real time, performing a secondary conversion of encrypting the second common authentication key and generate an encrypted second common authentication key, performing a conversion using a unidirectional function while the unique key of the authentication institute provided by the authentication server in advance and the encrypted second common authentication key are taken as elements to generate a first user authentication key, performing an OTP operation on the first user authentication key or a second user authentication key that is a converted value of the first user authentication key and generating first user authentication information, and (4) performing a user authentication or an authentication of the authentication server for determining a genuineness of the authentication server, based on whether the first server authentication information and the first user authentication information coincide with each other.

A first encryption key for encrypting the first common authentication key and a second encryption key for encrypting the second common authentication key may be generated by performing a conversion using a unidirectional function while a personal password input by the user as an element or are generated at random.

The first encryption key and the second encryption key may be generated by combining the personal password and a mechanical unique key of the user terminal and performing a conversion using a unidirectional function, the mechanical unique key of the user terminal being added as an element.

When the first common authentication key, the second common authentication key, the first encryption key, and the second encryption key are generated, a unique key of a dedicated application installed in the user terminal may be added as an element.

The second encryption key may be encrypted by using a third encryption key generated by combining the personal password and a mechanical unique key of the user terminal and performing a conversion using a unidirectional function (2) may include performing a conversion using a unidirectional function while the embedded unique key of the authentication institute and the encrypted first common authentication key are taken as elements, and generating the first server authentication key, by the authentication server, generating a second server authentication key that is extracted from the first server authentication key through a time extraction value generator by using time information by a specific reference, by the authentication server, and performing an OTP operation on the second server authentication key and generating the first server authentication information, by the authentication server, and (3) includes if the encrypted second common authentication key is generated, performing a conversion using a unidirectional function when the unique key of the authentication institute provided by the authentication server in advance and the encrypted second common authentication key are taken as elements, and generating the first user authentication key, by the user terminal, generating a second user authentication key that is extracted from the first user authentication key through a time extraction value generator by using time information by a specific reference, and performing an OTP operation on the second user authentication key and generating the first user authentication information, by the user terminal.

The user authentication method may further include, between (3) and (4), or after (4), performing a conversion using a unidirectional function while a second common authentication key decrypted by using a decryption key or the unencrypted second common authentication key, and the first server authentication information transmitted from the authentication server or the first user authentication information are taken as elements, and generating a third user authentication key, by the user terminal, performing an OTP operation on the third user authentication key and generate a second user authentication information, by the user terminal, the method may further include transmitting the second user authentication information and the decryption key to the authentication server, by the user terminal, decrypting the encrypted first common authentication key to a first common authentication key by using the decryption key, performing a conversion using a unidirectional function while the first common authentication key and the first user authentication information transmitted from the user terminal or the first server authentication information are taken as elements, to generate a third server authentication key, by the authentication server, and performing an OTP operation on the third server authentication key and generating a second server authentication information, by the authentication server, and the method may further include, after (4), determining whether the second user authentication information and the second server authentication information coincide with each other and performing a user authentication.

The user authentication method may further include, between (3) and (4), or after (4), performing a conversion using a unidirectional function while a second common authentication key decrypted by using a decryption key or the unencrypted second common authentication key, and the first server authentication information transmitted from the authentication server or the first user authentication information is taken as an element, and generating a third user authentication key, by the user terminal, generating a fourth user authentication key that is extracted from the third user authentication key through a time extraction value generator by using time information by a specific reference, by the user terminal, and performing an OTP operation on the fourth user authentication key and generating a second user authentication information, the method may further include transmitting the second user authentication information and the decryption key to the authentication server, by the user terminal, decrypting the encrypted first common authentication key to a first common authentication key by using the decryption key, performing a conversion using a unidirectional function while the first user authentication information transmitted from the user terminal or the first server authentication information and the first common authentication key are taken as elements, to generate a third server authentication key, by the authentication server, and generating a fourth server authentication key that is extracted from the third server authentication key through a time extraction value generator by a specific reference by using time information, by the authentication server, and performing an OTP operation on the fourth server authentication key and generating a second server authentication information, the method may further include, after (4), determining whether the second user authentication information and the second server authentication information coincide with each other and performing a user authentication.

(3) may further include measuring a gap time value that is a time value that is obtained by measuring a time consumed to input a personal password for authentication by the user in unit of 1/n (n is a positive real number) seconds and transmitting the gap time value to the authentication server, by the user terminal, wherein when the third user authentication key is generated by the user terminal, the gap time value or a gap time key that is a number value extracted from the gap time value by a specific reference is added as an element, and when the authentication server generates the third server authentication key, the time gap value or the gap time key may be added as an element.

(3) may further include measuring a gap time value that is a time value that is obtained by measuring a time consumed to input a personal password for authentication by the user in unit of 1/n (n is a positive real number) seconds and transmitting the gap time value to the authentication server, by the user terminal, wherein when the third user authentication key or the fourth user authentication key is generated by the user terminal, the gap time value or a gap time key that is a number value extracted from the gap time value by a specific reference is added as an element, and when the authentication server generates the third server authentication key or the fourth server authentication key, the time gap value or the gap time key may be added as an element.

A verification key for verifying integrity of data may be added to transmission target data including authentication information or an authentication key transmitted from the user terminal or the authentication server and is transmitted, a first OTP operation value, which was obtained by performing OTP operations on the transmission target data, may be added to the verification key, and when the user terminal or the authentication server receives the data, the integrity of the authentication may be verified by comparing a second OTP operation value, which was obtained by performing OTP operations on the received data, and the verification key.

The authentication server may request an additional manual input of the second user authentication information from the user terminal when a plurality of first server authentication information is transmitted in a specific time, and may compare the manually input second user authentication information and the second server authentication information and may perform a user authentication if the second user authentication information is transmitted through a manual input.

The user authentication method may further include requesting a third user authentication information from the user terminal, by the authentication server, and if the third user authentication information is transmitted through the user terminal, determining whether the third user authentication information and the third server authentication information coincide with each other and performing a user authentication, by the authentication server, the third user authentication information may be generated by performing a conversion using a unidirectional function while the unique key of the authentication institute and the fourth user authentication key are taken as elements to generate a fifth user authentication key, and performing an OTP operation on the fifth user authentication, by the user terminal, and the third server authentication information may be generated by performing a conversion using a unidirectional function while the unique key of the authentication institute and the fourth server authentication key are taken as elements to generate a fifth server authentication key, and performing an OTP operation on the fifth server authentication, by the authentication server.

The user terminal may detect a symptom of an attack including hacking while the authentication procedure of (1) to (4) is performed, and compulsorily stops the authentication procedure by generating a compulsory stop signal for compulsorily stopping the authentication procedure and transmitting the compulsory stop signal to the authentication server when the symptom of an attack is detected.

Other aspects, advantages, and salient features of the disclosure will become apparent to those skilled in the art from the following detailed description, which, taken in conjunction with the annexed drawings, discloses various embodiments of the inventive concept.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, preferred embodiments of the inventive concept will be described in detail with reference to the accompanying drawings without any intention, except for an intention to provide full understanding of the inventive concept to those skilled in the art to which the inventive concept pertains.

Figure 1:
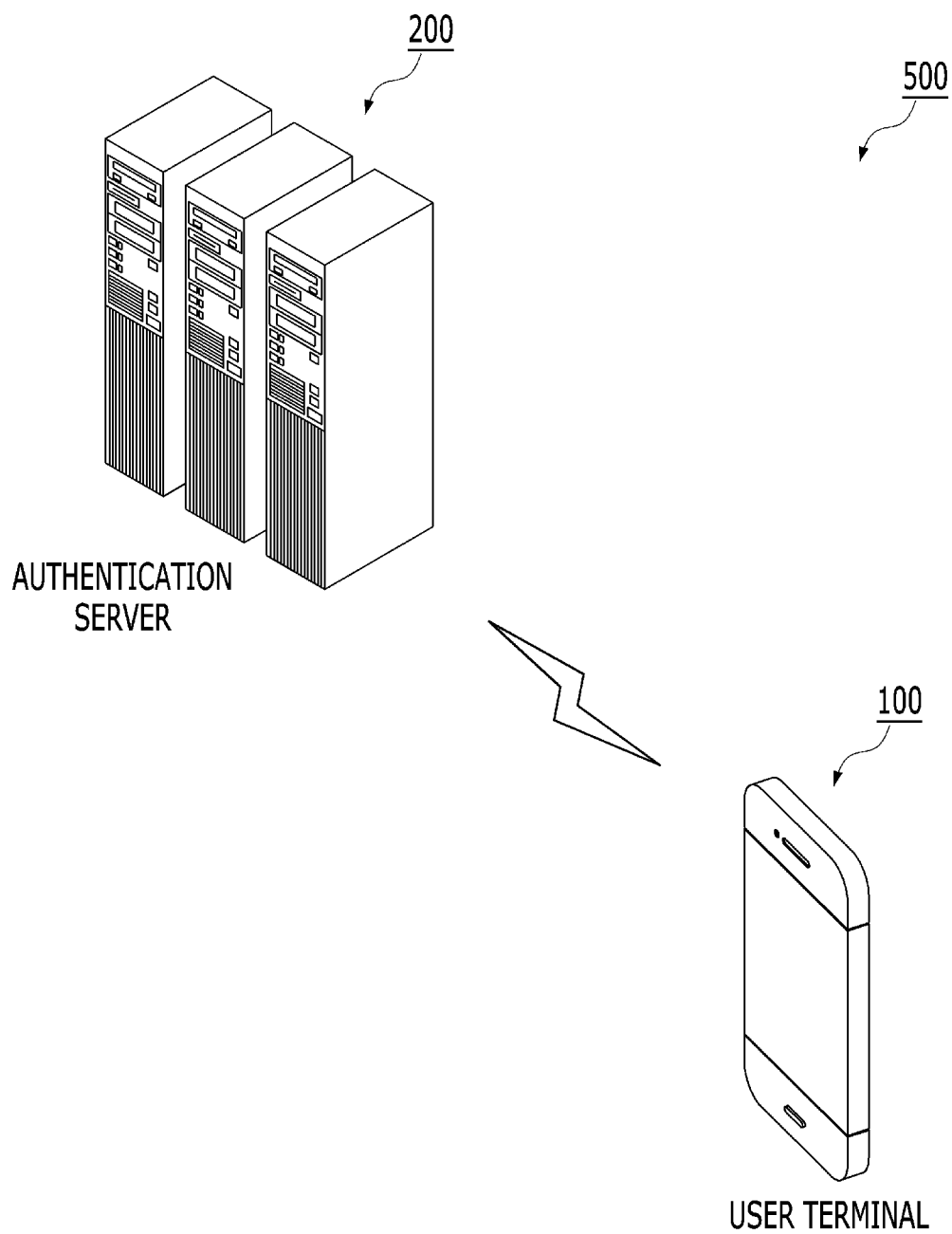
FIG. 1 is a brief concept view of an authentication device that is used in a user authentication method according to an embodiment of the inventive concept.

FIG. 1 is a brief concept view of an authentication device 500 that is used in a user authentication method according to an embodiment of the inventive concept.

As illustrated in FIG. 1, the authentication device 500 for the user authentication method according to the embodiments of the inventive concept includes a user terminal 100 and an authentication server 200.

The user terminal 100 is connected to the authentication server 200 through a wired/wireless internet network, and a dedicated application program (hereinafter, 'a dedicated app') for a user authentication provided by the authentication server 200 is installed in the user terminal 100. The user terminal 100 may include a mobile terminal, such as a smartphone, a tablet, or a PDA, which are well known to those skilled in the art. Further, the user terminal 100 may include a desktop PC, a notebook, a terminal for a thin client, a terminal for a zero-client. Here, the terminal for a thin client refers to a business terminal that is designed to allow a central server connected the terminal through a network to manage all business while only essential hardware devices, such as a CPU and a memory, are mounted on the terminal. The terminal for a zero client refers to a device that functions only as a terminal that excludes all essential elements such as a memory without requiring a PC body and accesses only a server such that the server may process all business.

According to the inventive concept, the user terminal 100 refers to all terminals that may perform wired/wireless communication that may be used by a user, but when it is necessary to particularly classify them, a mobile terminal including a smartphone, a tablet, and a PDA are referred to as a first user terminal and a terminal, such as a desktop PC, a notebook, a terminal for a thin client, or a terminal for a zero-client is referred to as a second user terminal, in which case the same reference numeral '100' is used for them.

The authentication server 200 may generally include a server that is used in an authentication procedure, such as a user authentication, in an authentication institute, such as a financial institute, and may include other authentication servers that are well known to those skilled in the art.

Hereinafter, an authentication number for authentication, a number such as a password, a unique key, an authentication key, or authentication information is a combination of letters, special characters, numbers, and various symbols, and it is clear that the combination does not mean only a combination of numbers, and may mean an encrypted one or may mean an unencrypted one. Further, last terms, such as number, key, and information, are terms that are given for convenience of classification, and special meanings are not given to the terms.

Further, Hereinafter, various configurations performed by the user terminal 100 may be configurations performed by a dedicated app installed in the user terminal 100. Accordingly, when it is described that a configuration is performed by the user terminal 100, it may mean that the configuration is performed by a dedicated app installed in the user terminal 100.

Further, a term 'a specific reference' is used in the inventive concept, and the term of a specific reference means a certain or predetermined reference but does not mean the same reference even though the same term is used in a plural form. Accordingly, when a term of a specific reference is used in a plural form in the inventive concept, they do not mean the same reference unless the same reference is particularly explicitly defined.

Hereinafter, various embodiments of user authentication methods, in which case a user terminal 100 and an authentication server 200 are basic configurations, according to the inventive concept will be described.

Figure 2:
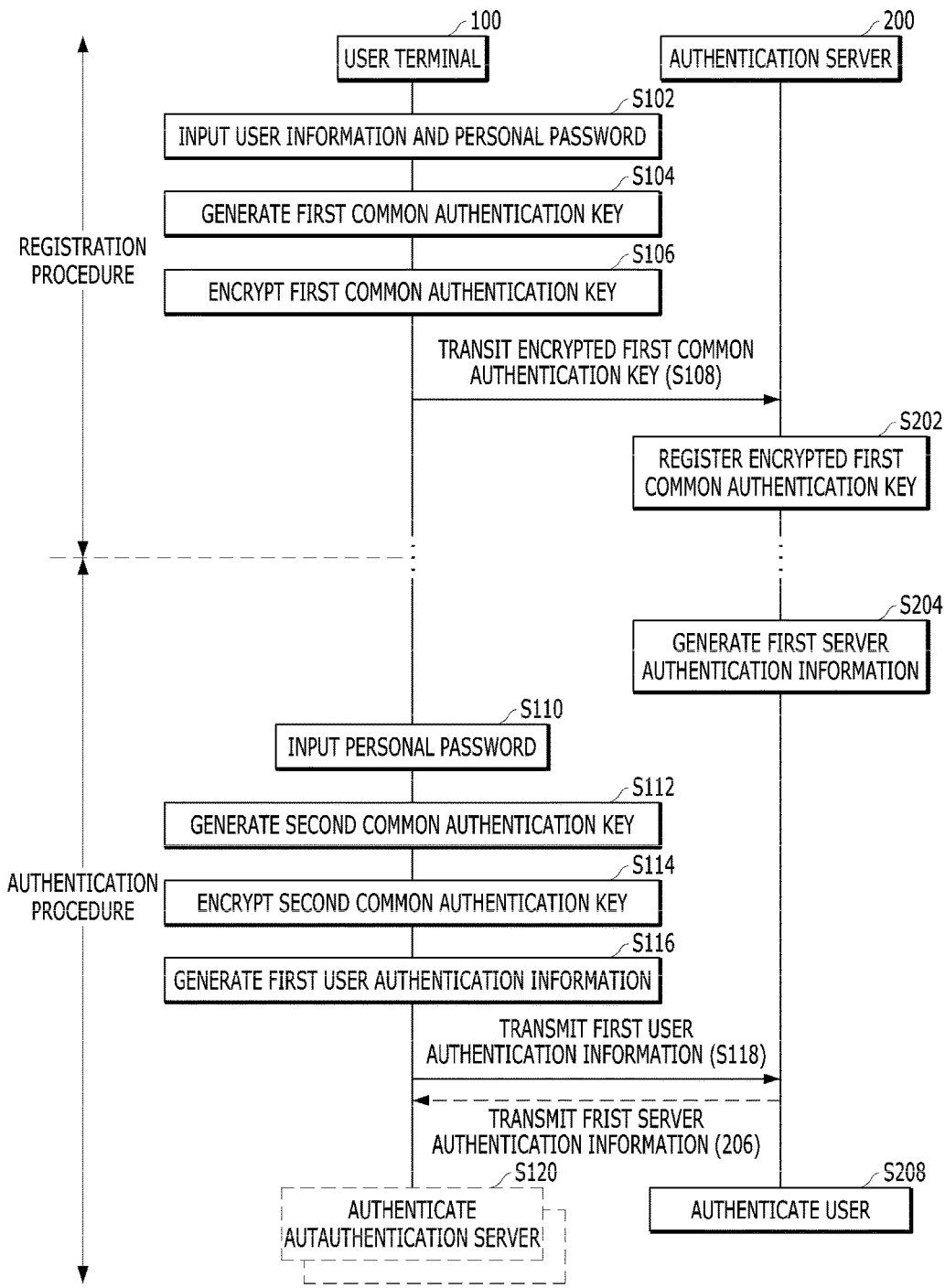
FIG. 2 is a flowchart illustrating a user authentication method according to a first embodiment of the inventive concept.
Figure 3:
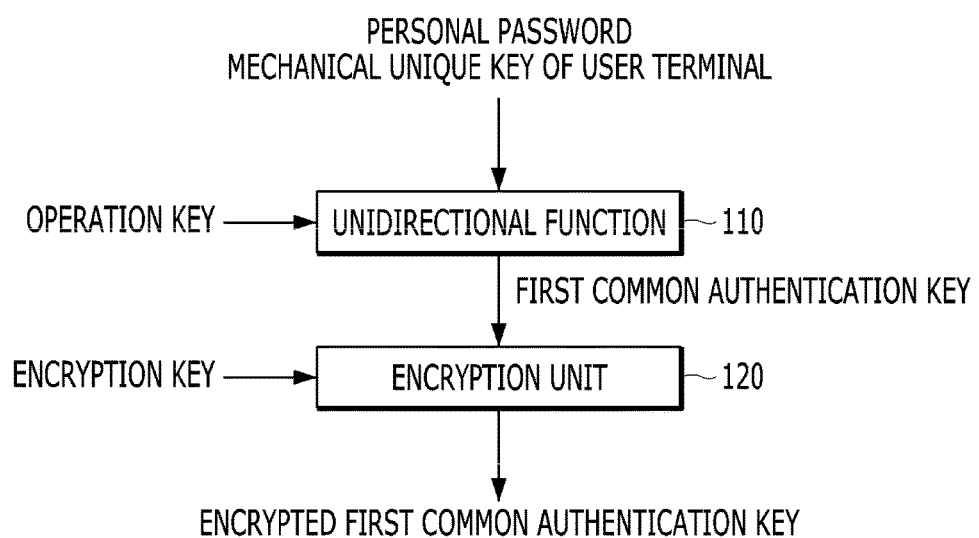
FIG. 3 is a block diagram illustrating a process of generating a first common authentication key and an encrypted first common authentication key in FIG. 2.
Figure 4A:
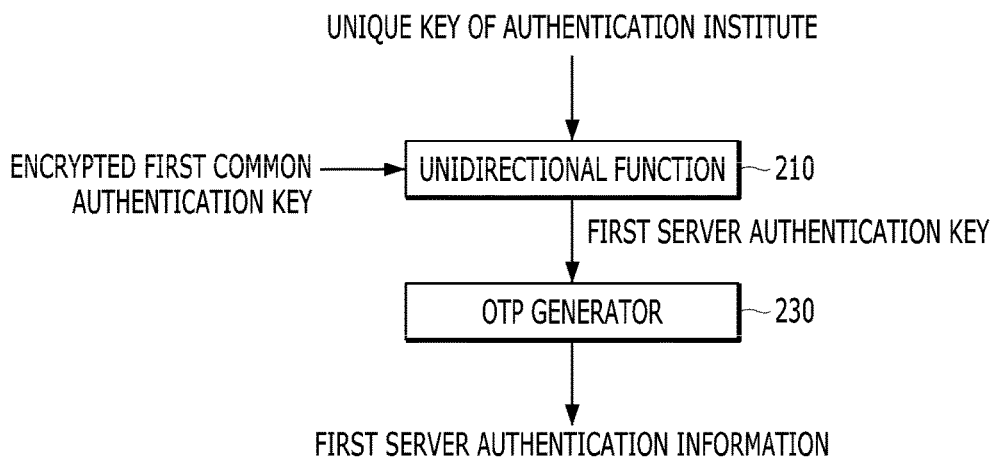
FIGS. 4A and 4B are block diagrams illustrating processes of generating first server authentication information in FIG. 2.
Figure 4B:
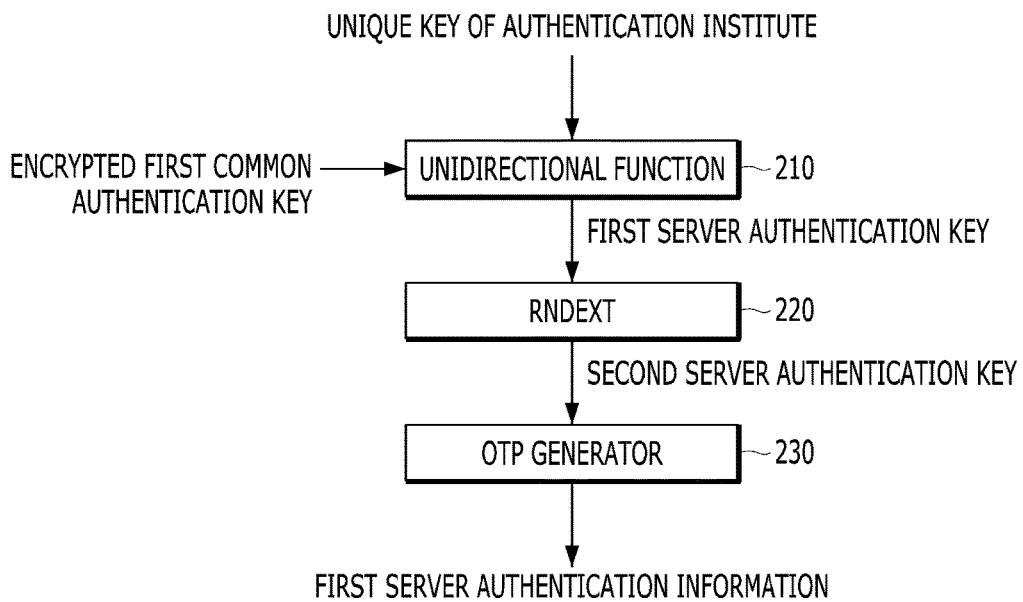
Figure 5A:
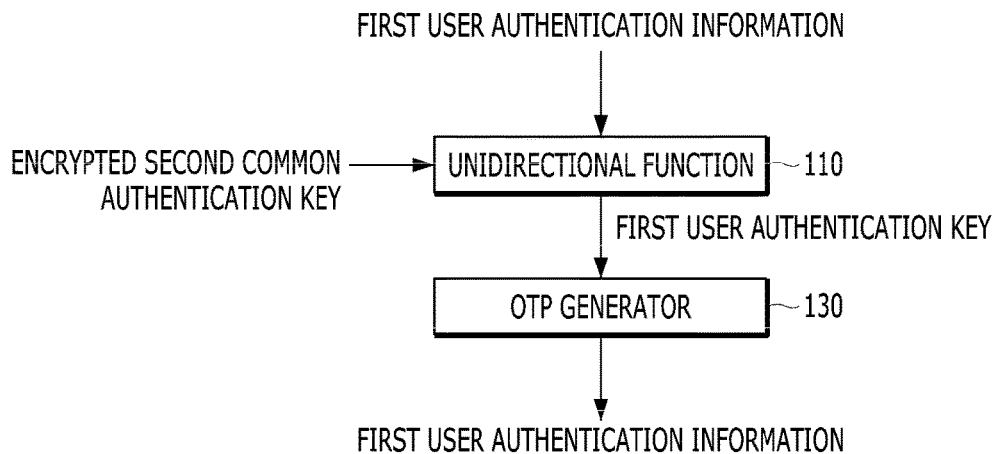
FIGS. 5A and 5B are block diagrams illustrating processes of generating first user authentication information in FIG. 2.
Figure 5B:
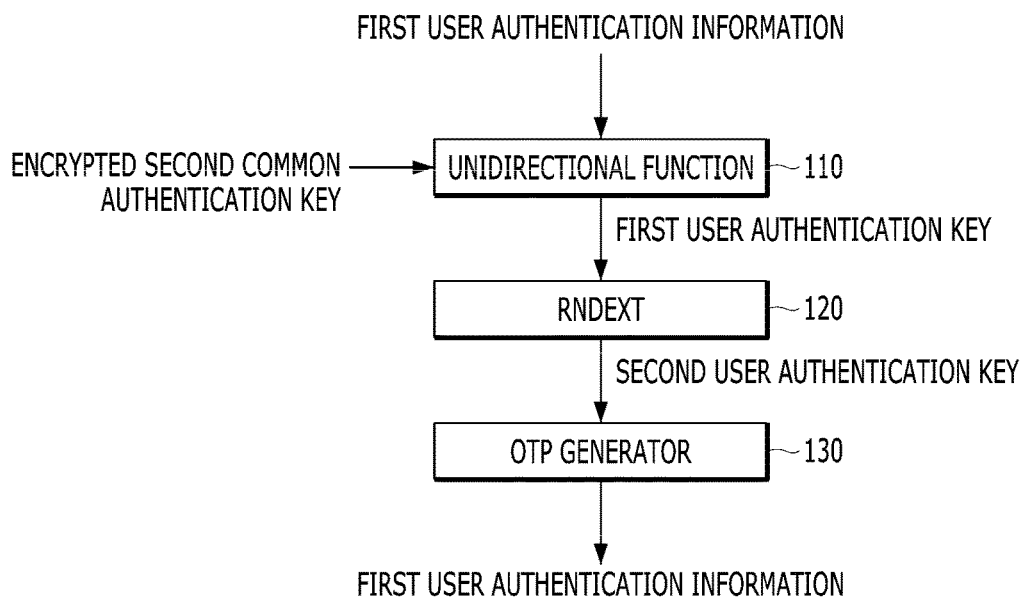

FIG. 2 is a flowchart illustrating a user authentication method according to a first embodiment of the inventive concept. FIG. 3 is a block diagram illustrating a process of generating a first common authentication key and an encrypted first common authentication key in FIG. 2. FIGS. 4A and 4B are block diagrams illustrating processes of generating first server authentication information. FIGS. 5A and 5B are block diagrams illustrating processes of generating first user authentication information.

As illustrated in FIGS. 2 to 5, the user authentication method according to the first embodiment of the inventive concept may be started by downloading and installing a dedicated app by the user so that a user terminal 100 may register a user. The user registration procedure may be performed in the process of installing the dedicated app, but also may be performed through a separate user registration process after the dedicated app is installed.

First, if a user starts a procedure for registration of the user and inputs user information and a personal password through the user terminal 100 (S102), the user terminal 100 generates a first common authentication key by performing a primary conversion using a unidirectional function 110 by using a mechanical unique key of the user terminal 100 (S104).

Here, the first common authentication key may be generated through a primary conversion using the unidirectional function 110 through an operation key generated by a specific reference while a mechanical unique key of the user terminal 100 is taken as an exclusive element, but another element may be added to the mechanical unique key of the user terminal 100.

In the first embodiment of the inventive concept, the personal password input by the user may be added as an element for generating the first common authentication key.

Here, the mechanical unique key of the user terminal 100, for example, may include a serial number or a USIM number, and also may include various unique numbers or phone numbers that are given to classify user terminals.

The unidirectional function 110 is a function of mapping and converting data of an arbitrary length to data of a fixed length, and may refer to all functions known as being able to make it impossible to perform an inverse transformation, that is, to restore original data. The unidirectional function 110 may include all unidirectional functions, including a cryptologic hash function, such MD5, SHA, SHA2, or scrypt and a no-cryptologic hash function such as CRC32 or CHECHSUM, which are known to those skilled in the art, and the first common authentication key may be generated by using any one unidirectional function selected from the unidirectional functions.

As illustrated in FIG. 3, the first common authentication key may be generated by performing a calculation through a operation key generated by a specific reference while the personal password and the unique key of the user terminal 100 are taken as elements and primarily converting the calculated value. The first common authentication key may further include a unique key (e.g. a device token, a bundle ID, a package name, or an app ID) of the dedicated app.

Thereafter, the first common authentication key is converted to an encrypted first common authentication key through a secondary conversion of encrypting the first common authentication key through an encryption unit 120 (S106).

Here, the encryption may be made by using a symmetrical scheme in which an encryption key for encryption and a decryption key for decryption, and an encryption scheme, which is selected from Twofish, Serpent, AES, Blowfish, CAST5, RC4, 3DES, IDEA, RC6, and DES, may be used. In addition, an encryption scheme, which is well known to those skilled in the art, may be applied.

The user terminal 100 may transmit the encrypted first common encryption key to the authentication server 200, together with the user information (S108).

The authentication server 200 matches the encrypted first common encryption key, which has been transmitted from the user terminal 100, with the user information and the encrypted first common authentication key is registered and stored in the authentication server 200 together with the user information (S202). Accordingly, a user registration procedure is performed. If the user registration procedure is performed, the user terminal 100 may delete the encrypted first common authentication key.

According to the related art, an authentication server stores a personal password if a user registration is performed, but in the first embodiment of the inventive concept, neither the authentication server 200 nor the user terminal 100 stores a password and the authentication server 200 stores only the encrypted first common authentication key.

Accordingly, when the user forgets his or her personal password or the personal password is leaked, an encrypted first common authentication key including a new password may be transmitted to and registered in the authentication server 200 through a new registration procedure and accordingly, security may be enhanced.

Further, leakage of personal information may be prevented through a primary conversion using a unidirectional function, a user authentication or an authentication of an authentication server may be made in an open network environment through a secondary conversion of encryption.

Thereafter, the authentication server 200 may generate first server authentication information by combining an embedded unique key of an authentication institute and the encrypted first common authentication key (S204).

As illustrated in FIGS. 4A and 4B, the first server authentication information may be generated through two schemes.

As illustrated in FIG. 4A, according to one scheme, the authentication server 200 generates a first server authentication key through a conversion by using the unidirectional function 210 while the embedded unique key of the authentication institute and the encrypted first common authentication key are taken as elements, and may generate first server authentication information that is synchronized to a time value, by performing an OTP operation on the first server authentication key. Here, the first server authentication key may be generated by performing a conversion using the unidirectional function 210 on the encrypted first common authentication key while the unique key of the authentication institute is taken as an operation key. Further, the first server authentication information may be generated through an OTP operation using an OTP generator 230.

As illustrated in FIG. 4B, according to another scheme, the authentication server 200 generates a first server authentication key through a conversion by using the unidirectional function 210 while the embedded unique key of the authentication institute and the encrypted first common authentication key are taken as elements, and may generate a second sever authentication key that is extracted from the first server authentication key by a specific reference by using time information.

The second server authentication key may be extracted through a separate time extraction value generator 220 to be generated, and the second server authentication key may mean an arbitrary synchronous value generated by the first server authentication key. The operation principle of the time extraction value generator 220 is the same as that of a general OTP generator, and the general OTP generator may display an output value with a number but, in contrast, the time extraction value generator 220 displays an output value with an number, a letter, or other various symbols. Accordingly, it should be understood that the time extraction value generator 220 includes an OTP generator that performs a general OTP operation.

Thereafter, the authentication server 200 may generates the first server authentication information by performing an OTP operation through the OTP generator 230 on the second server authentication key.

The first server authentication information may be independently generated regardless of other procedures after the registration of the user. That is, it is satisfactory as long as the first server authentication information is generated from the registration of the user to a time point when the first user authentication information, which will be described below, is generated.

Further, even when the first server authentication information is transmitted to the user terminal 100, it may be transmitted immediately after it is generated but also may be transmitted at a necessary time point. Further, it may be transmitted in response to a request of the user terminal 100.

Thereafter, if an authentication procedure is started by the user and the personal password is input for authentication of the user by the user terminal 100 (S110), the user terminal 100 generates a second common authentication key by performing a primary conversion using the unidirectional function 110, by using a mechanical unique key of the user terminal 100 (S112).

Here, the second common authentication key may be generated through a primary conversion using the unidirectional function 110 through a calculation key generated by a specific reference while a mechanical unique key of the user terminal 100 is taken as an exclusive element, but another element may be added to the mechanical unique key of the user terminal 100.

In the first embodiment of the inventive concept, similarly to the scheme of generating the first common authentication key, the personal password input by the user may be added as an element for generating the second common authentication key.

That is, the second common authentication key is generated by combining the personal password and the mechanical unique key of the user terminal 100 and performing a primary conversion using the unidirectional function 110 (S112).

The unidirectional function 110 may be the same function as the unidirectional function that has generated the first common authentication key, and may be applied in the same manner.

Similarly to the scheme of generating the first common authentication key, the second common authentication key may be generated by performing a calculation through a calculation key generated by a specific reference while the personal password and the unique key of the user terminal 100 are taken as elements and primarily converting the calculated value.

The second common authentication key may further include a unique key (e.g. a device token, a bundle ID, a package name, or an app ID) of the dedicated app. This scheme may be possible in response to a case in which the unique key of the dedicated app is included in the first common authentication key as an element.

Thereafter, similarly to the case of the first common authentication key, the second common authentication key is converted to an encrypted second common authentication key through a secondary conversion of encrypting the second common authentication key through the encryption unit 120 (S114). The encryption scheme may be applied in the same manner as that of the first common authentication key.

Thereafter, the user terminal 100 generates first user authentication information by using the encrypted second common authentication key (S116). The generation of the first server authentication information corresponding to the first user authentication information has been described already.

As illustrated in FIGS. 5A and 5B, the first user authentication information may be generated through two schemes.

As illustrated in FIG. 5A, according to one scheme, the authentication server 200 generates a first user authentication key through a conversion by using the unidirectional function 110 while a unique key of the authentication institute, which has been provided already, and the encrypted second common authentication key are taken as elements, and may generate first user authentication information that is synchronized to a time value, by performing an OTP operation on the first user authentication key. The unique key of the authentication institute may be embedded when the dedicated app is installed, or may be provided through an update before initiation of an authentication procedure.

Here, the first user authentication key may be generated by performing a conversion using the unidirectional function 110 on the encrypted second common authentication key while the unique key of the authentication institute is taken as an operation key. Further, the first user authentication information may be generated through an OTP operation using an OTP generator 130.

As illustrated in FIG. 5B, according to another scheme, the authentication server 200 generates a first user authentication key through a conversion by using the unidirectional function 110 while a unique key of the authentication institute, which has been provided already to the authentication server 200, and the encrypted second common authentication key are taken as elements, and may generate a second user authentication key that is extracted from the first user authentication key by a specific reference by using time information. The unique key of the authentication institute may be embedded when the dedicated app is installed, or may be provided through an update before initiation of an authentication procedure.

The second user authentication key may be extracted through a separate time extraction value generator 120 to be generated, and the second user authentication key may mean an arbitrary synchronous value generated by the first user authentication key. The operation principle of the time extraction value generator 120 is the same as that of a general OTP generator, and the general OTP generator may display an output value with a number but, in contrast, the time extraction value generator 120 displays an output value with an number, a letter, or other various symbols. Accordingly, it should be understood that the time extraction value generator 120 includes an OTP generator that performs a general OTP operation.

Thereafter, the user terminal 100 may generate the first user authentication information by performing an OTP operation through the OTP generator 130, on the second user authentication key.

Here, the scheme of generating the first user authentication information should be identical with the scheme of generating the first server authentication information. If the first server authentication information is generated through the scheme described through FIG. 4A, the first user authentication information also has to be generated in the scheme described through FIG. 5A. Further, the unidirectional functions or the OTP operations thereof have to correspond to each other. Further, if the first server authentication information is generated through the scheme described through FIG. 4B, the first user authentication information also has to be generated in the scheme described through FIG. 5B. Further, the unidirectional functions, the OTP operations, the time value extractions, and the like have to correspond to each other in the same scheme.

Thereafter, if the first user authentication information is transmitted to the authentication server 200 through the user terminal 100 (S118), the authentication server 200 performs a user authentication based on coincidence of the authentication information, that is, whether the first user authentication information and the first server authentication information coincide with each other (S208). The first user authentication information may be manually input and then be transmitted from the user, may be automatically transmitted, and may be automatically transmitted from a transmission instruction of the user.

Here, the user terminal 100 may include one or a plurality of user terminals that are connected to the authentication server 200. For example, a registration procedure of, for example, an encrypted first common authentication key, may be progressed by the first user terminal 100 and an authentication procedure may be progressed by the second user terminal 100, and an opposite case may be possible. Further, even in the authentication procedure, the first user authentication information may be generated by the first user terminal 100, and may be input or transmitted from the second user terminal 100. In addition, a plurality of user terminals 100 may be used in various procedures.

Further, the user may compare the first user authentication information and the first server authentication information through the user terminal 100 to identify the genuineness of the authentication server 200, the genuineness of an accessed webpage connected with the authentication server 200, or the genuineness of a service provider or an authentication institute that provides an authentication service. According to the related art, it is true that an accessed webpage of an authentication institute is forfeited so that the users are often confused, but there is no suitable measure. According to the inventive concept, it is possible for a user to identify the genuineness of an authentication institute (or a server provider) to solve the problem.

To achieve this, when the first server authentication information is generated, the authentication server 200 allows the first server authentication information to be displayed through the accessed webpage or to be transmitted to the user terminal 100 (S206). If the first server authentication information is displayed or transmitted, an authentication server 200 may be authenticated by allowing the user terminal 100 to compare the first server authentication information and the first user authentication information to determine whether the authentication server 200 is a genuine server or the accessed webpage is genuine (S120). That is, it may be identified whether the authentication server 200 is genuine, whether the accessed webpage connected with the authentication server 200, or whether the service provider or the authentication institute that provides an authentication server is genuine.

Here, when the first server authentication information is transmitted to the user terminal 100 in advance before the encrypted second common authentication key is generated, the authentication server 200 is authenticated by using the first server authentication information that has been transmitted in advance without the first server authentication information is retransmitted or separately transmitted.

In the first embodiment of the inventive concept, if the first server authentication information and the first user authentication information are compared by the user terminal 100, the authentication institute or the authentication server 200 may be authenticated, by identifying whether the first server authentication information and the first user authentication information coincide with each other, by determining whether the authentication institute or the authentication server 200 is genuine, and if the first server authentication information and the first user authentication information are compared by the authentication server 200, the user may be authenticated through the identification of the first server authentication information and the first user authentication information.

Here, the authentication procedures (S206 and S120) of the authentication server 200 and the user authentication procedures (S118 and S208) may be performed at the same time, and if the authentication is performed after the authentication procedure of the authentication server is performed first, the user authentication procedure is performed, and any one of the authentication procedure of the authentication server and the user authentication procedure may be selectively performed.

In the first embodiment of the inventive concept, all data that is transmitted between the user terminal 100 and the authentication server 200 may be encrypted in a public key scheme and be transmitted.

In the first embodiment of the inventive concept, when not the authentication server but the user is authenticated, if several user terminals 100 or the user authentication is performed by using a mobile terminal, a desktop PC, a table, and the like are used at the same time, a plurality of first user authentication information may be transmitted to the authentication server 200 in a specific time by an abnormality or an error even in the case of hacking.

In this case, for a robust authentication, even when the first user authentication information is transmitted, the authentication server 200 may request retransmission of the first user authentication information from the user terminal 100 and may request the retransmission of the first user authentication information not automatically but through a manual input. Then, the first user authentication information has to be displayed on a screen of the user terminal 100 such that the user may perform a manual input. Here, it may be requested to perform the manual input continuously two times. If the first user authentication information is transmitted through a manual input, the authentication server 200 may compare the first user authentication information transmitted through the manual input and the server authentication information to perform a user authentication.

Meanwhile, when a symptom of an attack, such as hacking, occurs in an authentication process, for example, a loading time is significantly slower than in normal time, that is, when a symptom of an attack, such as hacking, which is well known to those skilled in the art, including the case when promised values displayed on the screen of the desktop PC and the mobile terminal are different after a user logs in the desktop PC, the user terminal 100 may automatically or manually transmit a compulsory stop signal, by which an authentication procedure may be compulsorily stopped, to the authentication server 200. If the compulsory stop signal is transmitted to the authentication server 200, the user terminal 100 and the authentication server 200 stop the authentication procedure and wait until a new authentication procedure is started.

As another example, when the symptom of an attack is detected, the authentication server 200 may determine presence of an attack, may transmit a signal to ask about whether the authentication procedure is to be stopped, and may determine whether the authentication procedure is to be stopped, in response to a response signal of the user terminal 100.

Further, a verification key for verifying integrity of data may be added to all transmission target data including authentication information and authentication keys, which are transmitted between the user terminal 100 and the authentication server 200. That is, the verification key may be added to the transmission target data to be transmitted. The verification key may include a first OTP operation value, which was obtained by performing OTP operations on the transmission target data.

Further, when the user terminal 100 or the authentication server 200 receives the data, the integrity of the authentication may be verified by comparing a second OTP operation value, which was obtained by performing OTP operations on the received data, and the verification key.

For example, when the user terminal 100 transmits the first user authentication information to the authentication server 200, a first OTP operation value, which was obtained by performing an OTP operation on the first user authentication information, may be added to the first user authentication information as a verification key and may be transmitted. In this case, when the authentication server 200 receives the first user authentication information, the integrity of the first user authentication information may be verified by comparing a second OTP operation value, which was obtained by performing an OTP operation on the first user authentication information, from which the verification key was separated, and the verification key.

In the first embodiment of the inventive concept, when the authentication server 200 is authenticated by comparing the first user authentication information and the first server authentication information by the user terminal 100, an additional user authentication procedure is necessary. Further, when the authentication server 200 performs a user authentication by comparing the first user authentication information and the first server authentication information, an additional user authentication may be necessary to secure an additional reliability. To achieve this, a second embodiment of the inventive concept, which will be described below, is necessary.

Hereinafter, the second embodiment of the inventive concept will be described.

Figure 6:
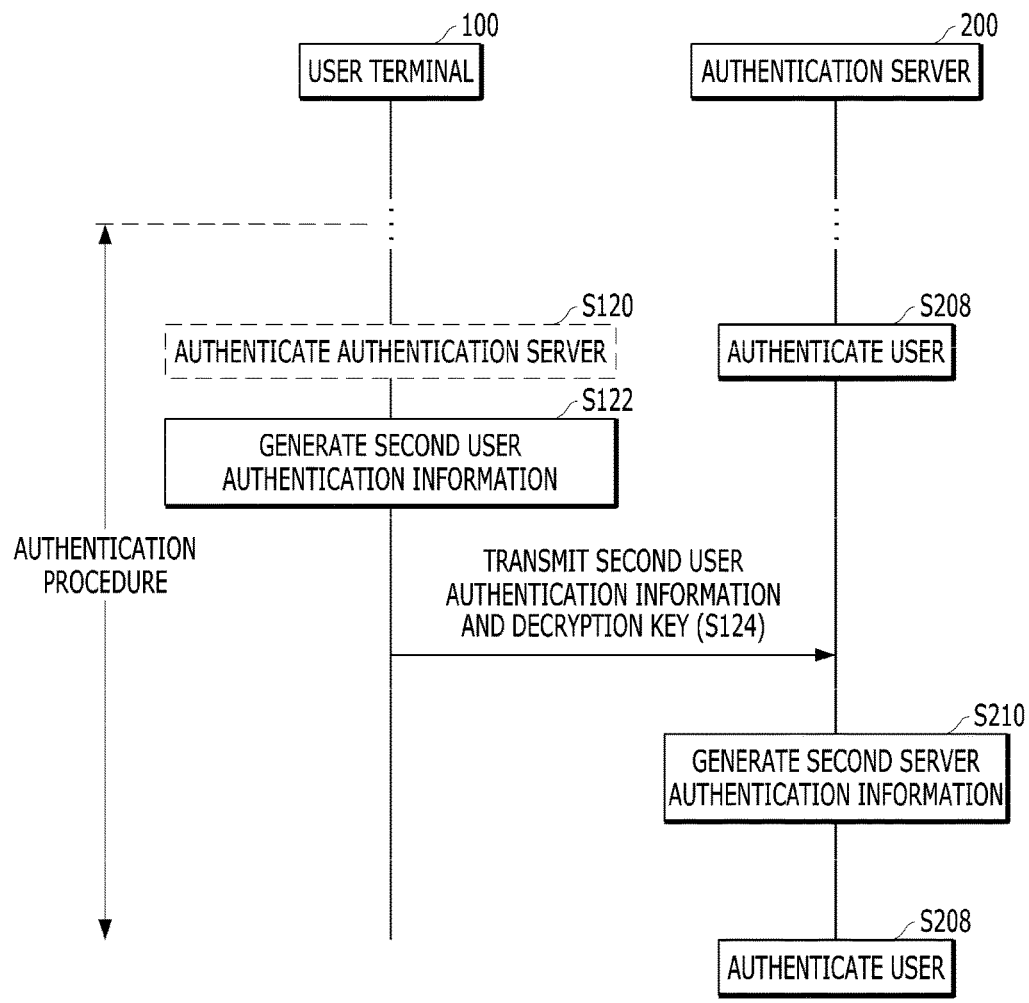
FIG. 6 is a flowchart illustrating a user authentication method according to a second embodiment of the inventive concept.

FIG. 6 is a flowchart illustrating a user authentication method according to a second embodiment of the inventive concept.

Figure 7A:
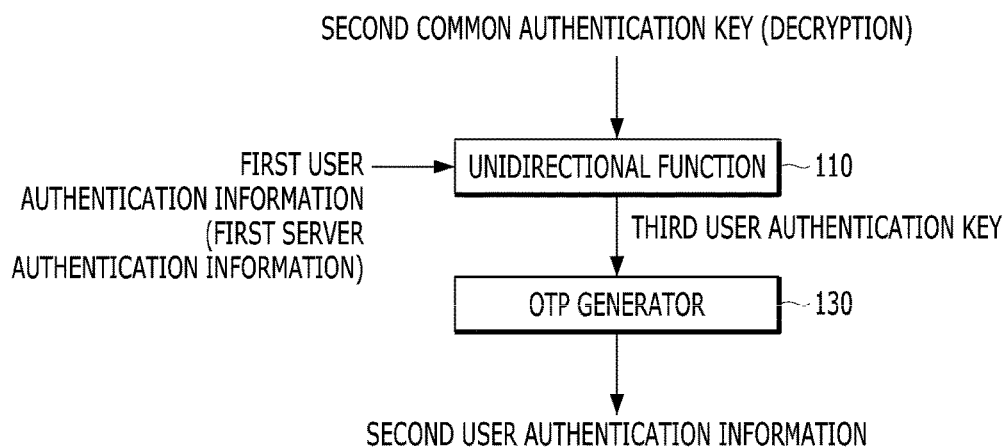
FIGS. 7A and 7B are block diagrams illustrating processes of generating second user authentication information in FIG. 6.
Figure 7B:
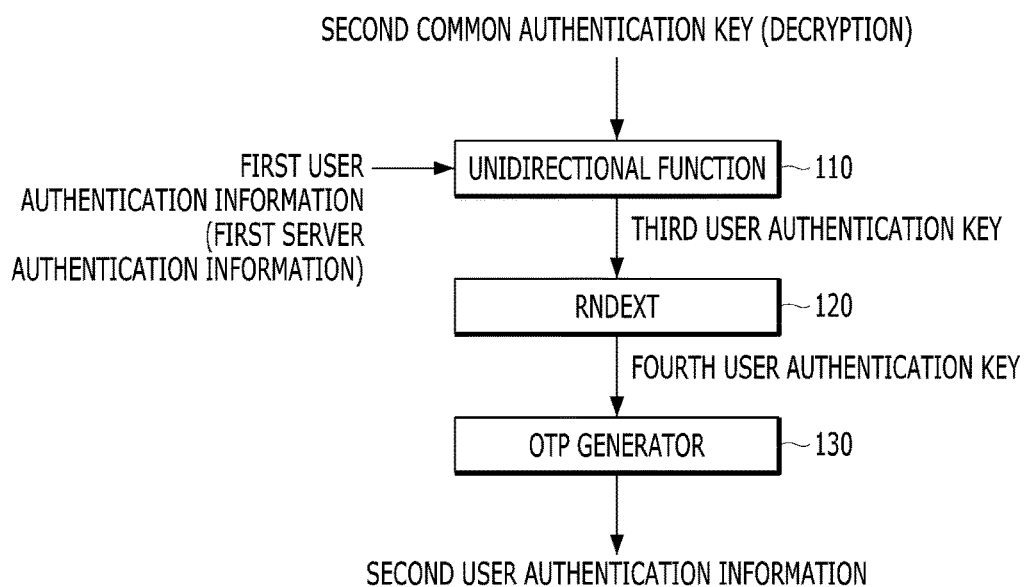
Figure 8A:
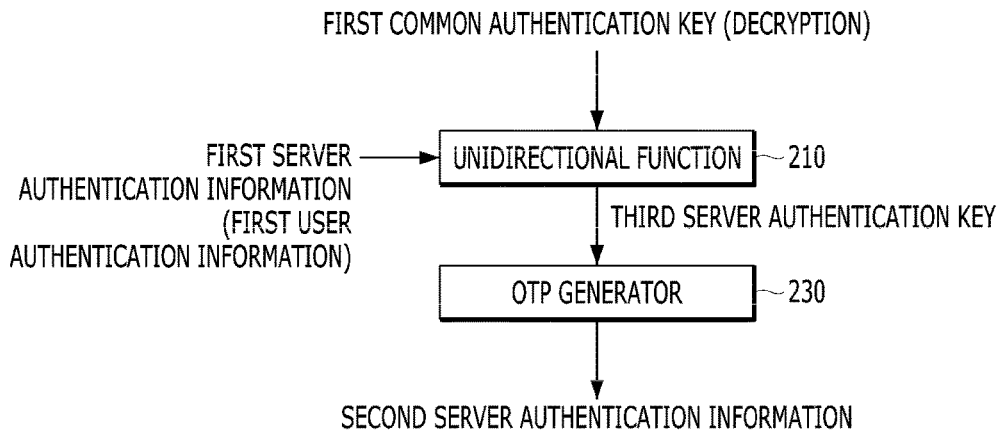
FIGS. 8A and 8B are block diagrams illustrating processes of generating second server authentication information in FIG. 6.
Figure 8B:
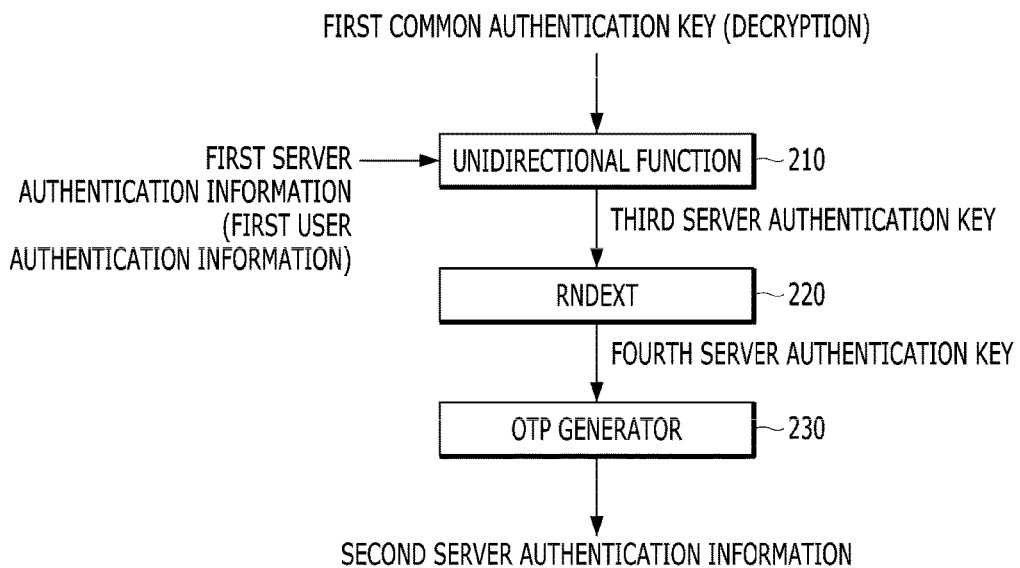

FIGS. 7A and 7B are block diagrams illustrating processes of generating second user authentication information in FIG. 6. FIGS. 8A and 8B are block diagrams illustrating processes of generating second server authentication information.

As illustrated in FIGS. 6 to 8, the user authentication method according to the second embodiment of the inventive concept includes all of the authentication procedures described in the first embodiment of the inventive concept, and may include a process, which is added while the user authentication (S208) and the authentication (S120) of the authentication server are performed through the first user authentication information and the first server authentication information. Accordingly, because the process of performing the user authentication (S208) and the authentication (S120) of the authentication server through the first user authentication information and the first server authentication information have been described in the first embodiment of the inventive concept, a detailed description thereof will be omitted.

Before the user authentication (S208) and the authentication (S120) of the authentication server are performed after the first server authentication information and the first user authentication information are generated, or after the user authentication (S208) and the authentication (S120) of the authentication server are performed through the first server authentication information and the first user authentication information, the user terminal 100 generates second user authentication information by using the first user authentication information or the first server authentication information and the second common authentication key (S122).

The elements for generating the second user authentication information generally include the first user authentication information and the second common authentication key, but may include the first server authentication information when the authentication server 200 transmits the first server authentication information. This may be possible with a premise that the first server authentication information and the first user authentication information have the same value. Hereinafter, a case of generating the second user authentication information by using the first user authentication information will be described.

Further, the second common authentication key may mean a second common authentication key that is obtained by decrypting the encrypted second common authentication key by using a decryption key, or a second common authentication key that is not encrypted. In the following, when there is no separate modifier in a second common authentication key, the second common authentication key may mean a decrypted second common authentication key or an unencrypted second common authentication key.

As illustrated in FIGS. 7A and 7B, the second user authentication information may be generated through two schemes.

As illustrated in FIG. 7A, according to one scheme, a third user authentication key may be generated through a conversion by using the unidirectional function 110 while the second common authentication key and the first user authentication information are taken as elements, and the second user authentication information that is synchronized to a time value may be generated by performing an OTP operation on the third user authentication key.

Here, the third user authentication key may be generated by performing a conversion using the unidirectional function 110 on the first user authentication information while the second common authentication key is taken as an operation key. Further, the second user authentication information may be generated through an OTP operation using an OTP generator 130.

According to another scheme, as illustrated in FIG. 7B, a third user authentication key is generated through a conversion using the unidirectional function 110 while the second common authentication key and the first user authentication information are taken as elements, and a fourth user authentication key that is extracted from the third user authentication key with a specific reference by using time information is generated.

The fourth user authentication key may be extracted through a separate time extraction value generator 120 to be generated, and the fourth user authentication key may mean an arbitrary synchronous value generated by the third user authentication key. The operation principle of the time extraction value generator 120 is the same as that of a general OTP generator, and the general OTP generator may display an output value with a number but, in contrast, the time extraction value generator 120 displays an output value with an number, a letter, or other various symbols. Accordingly, it should be understood that the time extraction value generator 120 includes an OTP generator that performs a general OTP operation.

Thereafter, the user terminal 100 may generate the second user authentication information, which has been synchronized to a time value, by performing an OTP operation through the OTP generator 130, on the fourth user authentication key.

If the second user authentication information is generated, the user terminal 100 provides the second user authentication information and the decryption key for decrypting the encrypted first common authentication key to the authentication server 200 (S124).

The authentication server 200 decrypts the encrypted first common authentication key to a first common authentication key by using the decryption key provided by the user terminal 100. In the following, the term of a first common authentication key that has no separate modifier may mean a first common authentication key.

Further, second server authentication information is generated by using the first common authentication key and the first server authentication information. Here, when the first user authentication information is transmitted from the user terminal 100, the first user authentication information is used instead of the first server authentication information, which is the same as in the case of generating the second user authentication information.

As illustrated in FIGS. 8A and 8B, the second server authentication information may be generated through two schemes.

As illustrated in FIG. 8A, according to one scheme, the authentication server 200 generates a third server authentication key through a conversion by using the unidirectional function 210 while the first server authentication information and the first common authentication key are taken as elements, and may generate a second sever authentication information that is synchronized to a time value, by performing an OTP operation on the third server authentication key. Here, the third server authentication key may be generated by performing a conversion using the unidirectional function 210 on the first server authentication information while the first common authentication key is taken as an operation key. Further, the second server authentication information may be generated through an OTP operation on the third server authentication key by using an OTP generator 230.

As illustrated in FIG. 8B, according to another scheme, the authentication server 200 generates a third server authentication key through a conversion by using the unidirectional function 210 while the first server authentication information and the first common authentication key are taken as elements, and may generate a fourth sever authentication key that is extracted from the third server authentication key by a specific reference by using time information.

The fourth server authentication key may be extracted through a separate time extraction value generator 220 to be generated, and the fourth server authentication key may mean an arbitrary synchronous value generated by the third server authentication key. The operation principle of the time extraction value generator 220 is the same as that of a general OTP generator, and the general OTP generator may display an output value with a number but, in contrast, the time extraction value generator 220 displays an output value with an number, a letter, or other various symbols. Accordingly, it should be understood that the time extraction value generator 220 includes an OTP generator that performs a general OTP operation.

Thereafter, the authentication server 200 may generates the second server authentication information by performing an OTP operation through the OTP generator 230 on the fourth server authentication key.

Here, the scheme of generating the second user authentication information should be identical with the scheme of generating the second server authentication information. If the second server authentication information is generated through the scheme described through FIG. 8A, the second user authentication information also has to be generated in the scheme described through FIG. 7A. Further, the unidirectional functions or the OTP operations thereof have to correspond to each other. Further, if the second server authentication information is generated through the scheme described through FIG. 8B, the second user authentication information also has to be generated in the scheme described through FIG. 7B. Further, the unidirectional functions, the OTP operations, the time value extractions, and the like have to correspond to each other in the same scheme.

Thereafter, the authentication server 200 performs a user authentication, based on coincidence of the authentication information, that is, whether the second user authentication information and the second server authentication information coincide with each other (S212). The second user authentication information may be manually input and then be transmitted from the user, may be automatically transmitted, and may be automatically transmitted from a transmission instruction of the user.

Here, the user terminal 100 may include one or a plurality of user terminals that are connected to the authentication server 200. For example, a registration procedure of, for example, a first common authentication key, may be progressed by the first user terminal 100 and an authentication procedure may be progressed by the second user terminal 100, and an opposite case may be possible. Further, even in the authentication procedure, the first user authentication information or the second user authentication information may be generated by the first user terminal 100, and may be input or transmitted from the second user terminal 100. In addition, a plurality of user terminals 100 may be used in various procedures.

In the second embodiment of the inventive concept, all data that is transmitted between the user terminal 100 and the authentication server 200 may be encrypted in a public key scheme and be transmitted.

In the second embodiment of the inventive concept, when the user is authenticated, if several user terminals 100 or the user authentication is performed by using a mobile terminal, a desktop PC, a table, and the like are used at the same time, a plurality of first user authentication information or first server authentication information may be transmitted in a specific time by an abnormality or an error even.

In particular, an authentication server is authenticated by transmitting the first server authentication information to the user terminal 100 and a user is authenticated by transmitting the second user authentication information to the authentication server 200, a plurality of first server authentication information may be transmitted from the authentication server 200 to different user terminals 100 or the same user terminal 100 for a specific period of time (e.g., 30 seconds, 60 seconds, or the like).

In this case, for a robust authentication, even after the second user authentication information is transmitted, the authentication server 200 may request retransmission of the second user authentication information from the user terminal 100 and may request the retransmission of the first user authentication information not automatically but through a manual input. Then, the second user authentication information has to be displayed on a screen of the user terminal. If the second user authentication information is transmitted through a manual input in the user terminal 100, the authentication server 200 may compare the manually input second user authentication information and the second server authentication information to additionally perform a user authentication.

In order to increase the security of an authentication, an additional authentication through comparison of third user authentication information and third server authentication information may be made after an additional authentication through retransmission of the second user authentication information or in place of an additional authentication through retransmission of the second user authentication information. The will be described with reference to FIGS. 9A and 9B.

Figure 9A:
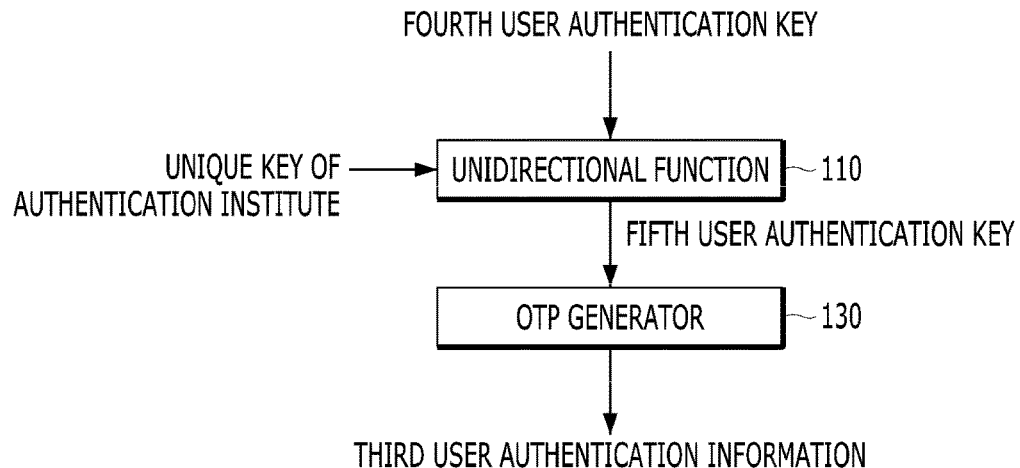
FIGS. 9A and 9B are block diagrams illustrating processes of third server authentication information and third user authentication information.
Figure 9B:
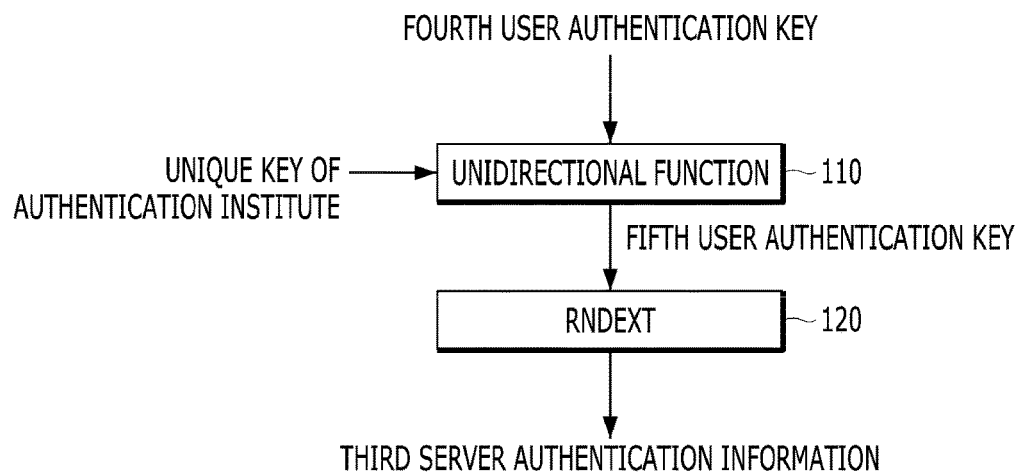

FIGS. 9A and 9B are block diagrams illustrating processes of third server authentication information and third user authentication information.

The authentication server 200 requests the third user authentication information from the user terminal 100 after an additional authentication through retransmission of the second user authentication information or in place of an additional authentication through retransmission of the second user authentication information.

In this case, as illustrated in FIG. 9A, the user terminal 100 may perform a conversion using a unidirectional function 110 while a fourth user authentication key that is an element for generating the second user authentication information and the unique key of the authentication institute are taken as elements to generate a fifth user authentication key, and perform an OTP operation on the fifth user authentication key to generate the third user authentication information.

Then, the authentication server 200 generates third server authentication information corresponding to the third user authentication information.

As illustrated in FIG. 9B, the user terminal 200 may perform a conversion using a unidirectional function 210 while a fourth server authentication key that is an element for generating the second server authentication information and the unique key of the authentication institute are taken as elements to generate a fifth server authentication key, and perform an OTP operation on the fifth server authentication key to generate the third server authentication information.

Thereafter, if the third user authentication information is transmitted to the authentication server 200, the authentication server 200 may determine whether the third user authentication information and the third server authentication information coincide with each other to perform an additional user authentication.

Further, when a symptom of an attack, such as hacking, occurs in an authentication process, for example, a loading time is significantly slower than in normal time, that is, when a symptom of an attack, such as hacking, which is well known to those skilled in the art, including the case when promised values displayed on the screen of the desktop PC and the mobile terminal are different after a user logs in the desktop PC, the user terminal 100 may automatically or manually transmit a compulsory stop signal, by which an authentication procedure may be compulsorily stopped, to the authentication server 200. If the compulsory stop signal is transmitted to the authentication server 200, the user terminal 100 and the authentication server 200 stop the authentication procedure and wait until a new authentication procedure is started.

As another example, when the symptom of an attack is detected, the authentication server 200 may determine presence of an attack, may transmit a signal to ask about whether the authentication procedure is to be stopped, may determine whether the authentication procedure is to be stopped, in response to a response signal of the user terminal 100.

Meanwhile, a verification key for verifying integrity of data may be added to all transmission target data including authentication information and authentication keys, which are transmitted between the user terminal 100 and the authentication server 200. That is, the verification key may be added to the transmission target data to be transmitted. The verification key may include a first OTP operation value, which was obtained by performing OTP operations on the transmission target data.

Further, when the user terminal 100 or the authentication server 200 receives the data, the integrity of the authentication may be verified by comparing a second OTP operation value, which was obtained by performing OTP operations on the received data, and the verification key.

For example, when the user terminal 100 transmits the first user authentication information or the second user authentication information to the authentication server 200, a first OTP operation value, which was obtained by performing a first OTP operation on the first user authentication information or the second user authentication information, may be added to the second user authentication information and may be transmitted. In this case, when the authentication server 200 receives the first user authentication information or the second user authentication information, the integrity of the first user authentication information or the second user authentication information may be verified by comparing a second OTP operation value, which was obtained by performing an OTP operation on the first user authentication information or the second user authentication information, from which the verification key was separated, and the verification key.

The second embodiment of the inventive concept has an enhanced security and an enhanced integrity. Here, an element may be added to enhance the security of the authentication procedure. Hereinafter, the third embodiment of the inventive concept will be described.

Figure 10A:
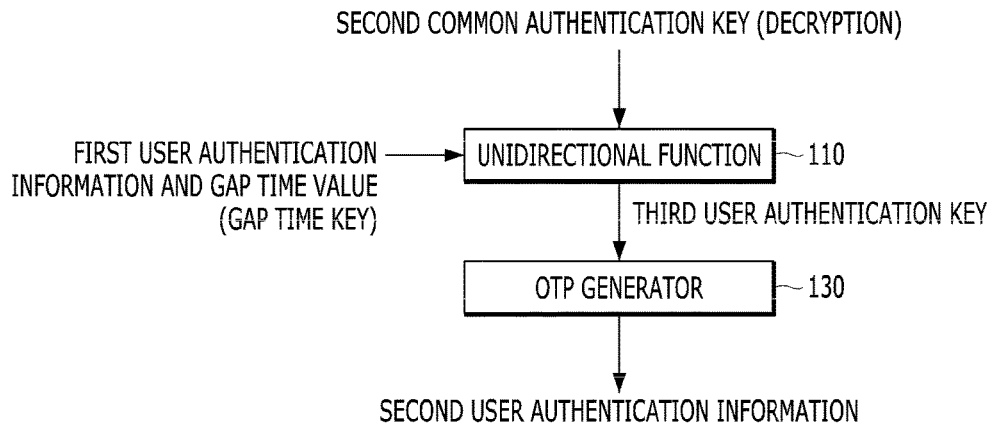
FIGS. 10A and 10B are block diagrams illustrating processes of generating second user authentication information in a user authentication method according to a third embodiment of the inventive concept.
Figure 10B:
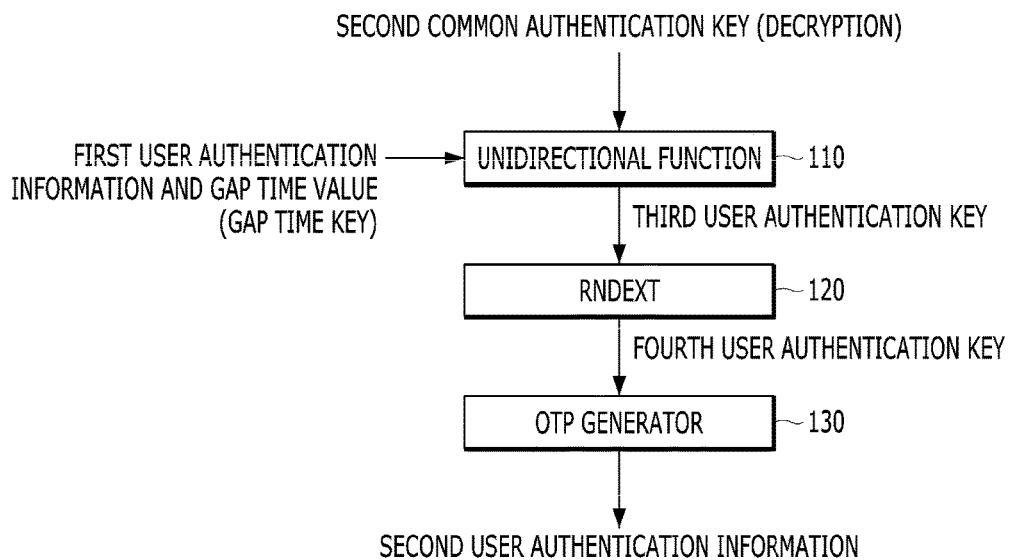
Figure 11A:
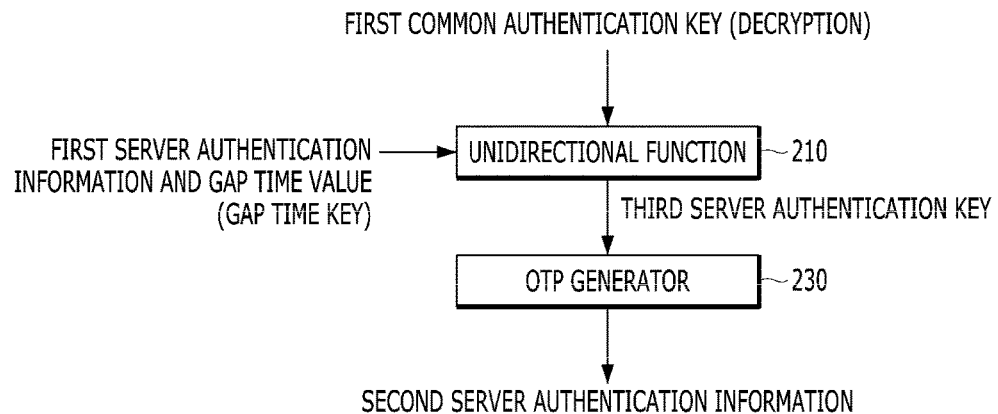
FIGS. 11A and 11B are block diagrams illustrating processes of generating second server authentication information in a user authentication method according to a third embodiment of the inventive concept.
Figure 11B:
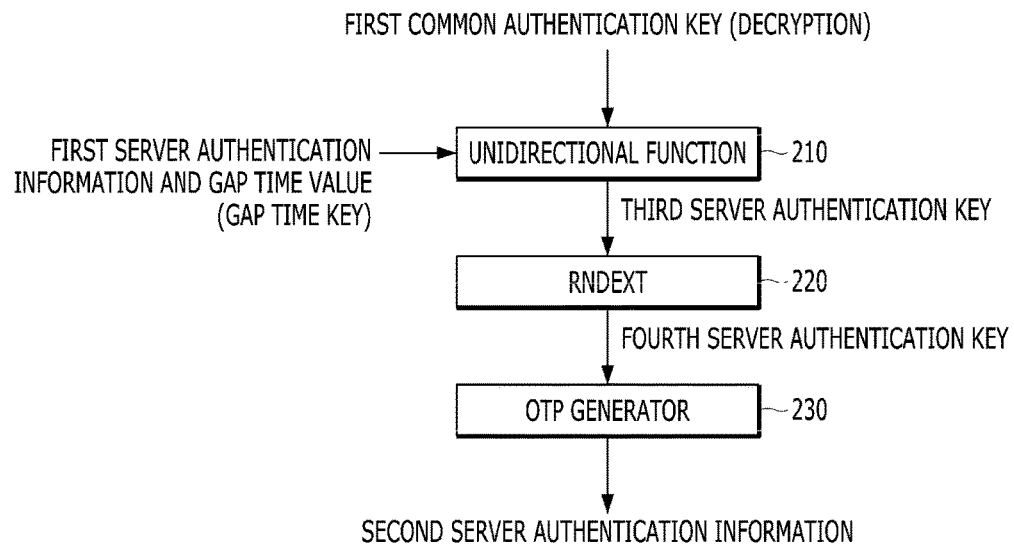

FIGS. 10A and 10B are block diagrams illustrating processes of generating second user authentication information in a user authentication method according to a third embodiment of the inventive concept. FIGS. 11A and 11B are block diagrams illustrating processes of generating second server authentication information in a user authentication method according to a third embodiment of the inventive concept.

As illustrated in FIGS. 10 and 11, the third embodiment of the inventive concept has the same configuration as that of the second embodiment of the inventive concept except that a gap time value or a gap time key is added as an element when the second user authentication information and the second server authentication information are generated.

The gap time value may be obtained through the procedure (S110) of inputting a personal password for an authentication by the user, of the procedures described through the first embodiment and the second embodiment of the inventive concept. In detail, if the user inputs a personal password for an authentication, the user terminal 100 may measure a time period that is consumed to input a personal password by the user in unit of 1/n (n is a positive real number) seconds, and then the measured time value may be defined as a gap time value.

Here, 1/n seconds may mean a time unit in a range that may be divided in hardware or software scheme of the user terminal 100. For example, the personal password is input from the first digit value to the last digit value, and 10 seconds may be expressed in unit of second, but $1/1000$ seconds may be obtained by 10436 or the like. Further, when the value is measured in unit of $1/1000000$ seconds or $1/1000000000$, a measurement value including many numbers may be obtained.

Here, when a time zone from a time point when an input window for inputting the personal password on a screen to a time point when the first digit value of the personal password is input is defined as a first time zone and a time zone from a time point when the last digit value of the personal password is input to a time point when a signal of an input key (or an enter key) that reports completion of an input of the personal password is input is defined as a second time zone, the gap time value may be a time measurement value from any one time point of the first time zone to any one time point of the second time zone.

The gap time key may mean a number value that is extracted from the gap time value by a specific reference.

When the gap time value is measured, the user terminal 100 transmits the gap time value and/or the gap time key to the authentication server 200. If the gap time value and/or the gap time key is transmitted from the user terminal 100, the authentication server 200 matches the gap time value and/or the gap time key with the user information or the like and stores and registers the matching result.

In the third embodiment of the inventive concept, as illustrated in FIGS. 10A and 10B, the second user authentication information may be generated through two schemes.

As illustrated in FIG. 10A, according to one scheme, a third user authentication key may be generated through a conversion by using the unidirectional function 110 while the second common authentication key, the first user authentication information, and the gap time value or the gap time key are taken as elements, and the second user authentication information that is synchronized to a time value may be generated by performing an OTP operation on the third user authentication key.

Here, the third user authentication key may be generated by performing a conversion using the unidirectional function 110 on the first user authentication information that is obtained by combining the gap time value or the gap time key and the first user authentication information while the second common authentication key is taken as an operation key. Further, the second user authentication information may be generated through an OTP operation on the third user authentication key by using an OTP generator 130.

According to another scheme, as illustrated in FIG. 10B, a third user authentication key may be generated through a conversion using the unidirectional function 110 while the second common authentication key, the first user authentication information, and the gap time value or the gap time key are taken as elements, and a fourth user authentication key that is extracted from the third user authentication key with a specific reference by using time information may be generated.

The fourth user authentication key may be extracted through a separate time extraction value generator 120 to be generated, and the fourth user authentication key may mean an arbitrary synchronous value generated by the third user authentication key. The operation principle of the time extraction value generator 120 is the same as that of a general OTP generator, and the general OTP generator may display an output value with a number but, in contrast, the time extraction value generator 120 displays an output value with an number, a letter, or other various symbols. Accordingly, it should be understood that the time extraction value generator 120 includes an OTP generator that performs a general OTP operation.

Thereafter, the user terminal 100 may generate the second user authentication information, which has been synchronized to a time value, by performing an OTP operation through the OTP generator 130, on the fourth user authentication key.

As illustrated in FIGS. 11A and 11B, the second server authentication information may be generated through two schemes.

As illustrated in FIG. 11A, according to one scheme, the authentication server 200 generates a third server authentication key through a conversion by using the unidirectional function 210 while the time gap value or the gap time key, the first server authentication information, and the first common authentication key are taken as elements, and may generate a second sever authentication information that is synchronized to a time value, by performing an OTP operation on the third server authentication key. Here, the third server authentication key may be generated by performing a conversion using the unidirectional function 210 on the first server authentication information that is obtained by combining the gap time value or the gap time key and the first server authentication information while the first common authentication key is taken as an operation key. Further, the second server authentication information may be generated through an OTP operation on the third server authentication key by using an OTP generator 230.

As illustrated in FIG. 11B, according to another scheme, the authentication server 200 may generate a third server authentication key through a conversion by using the unidirectional function 210 while the gap time value or the gap time key, the first server authentication information, and the first common authentication key are taken as elements, and may generate a fourth sever authentication key that is extracted from the third server authentication key by a specific reference by using time information.

The fourth server authentication key may be extracted through a separate time extraction value generator 220 to be generated, and the fourth server authentication key may mean an arbitrary synchronous value generated by the third server authentication key. The operation principle of the time extraction value generator 220 is the same as that of a general OTP generator, and the general OTP generator may display an output value with a number but, in contrast, the time extraction value generator 220 displays an output value with an number, a letter, or other various symbols. Accordingly, it should be understood that the time extraction value generator 220 includes an OTP generator that performs a general OTP operation.

Thereafter, the authentication server 200 may generates the second server authentication information by performing an OTP operation through the OTP generator 230 on the fourth server authentication key.

Here, the scheme of generating the second user authentication information should be identical with the scheme of generating the second server authentication information. If the second server authentication information is generated through the scheme described through FIG. 11A, the second user authentication information also has to be generated in the scheme described through FIG. 10A. Further, the unidirectional functions or the OTP operations thereof have to correspond to each other. Further, if the second server authentication information is generated through the scheme described through FIG. 11B, the second user authentication information also has to be generated in the scheme described through FIG. 10B. Further, the unidirectional functions, the OTP operations, the time value extractions, and the like have to correspond to each other in the same scheme.

In the first to third embodiments of the inventive concept, because the personal password input through the user terminal 100 is transmitted to the authentication server 200 after a primary conversion using a unidirectional function and a secondary conversion using encryption are performed on the personal password, security may be improved.

Figure 12:
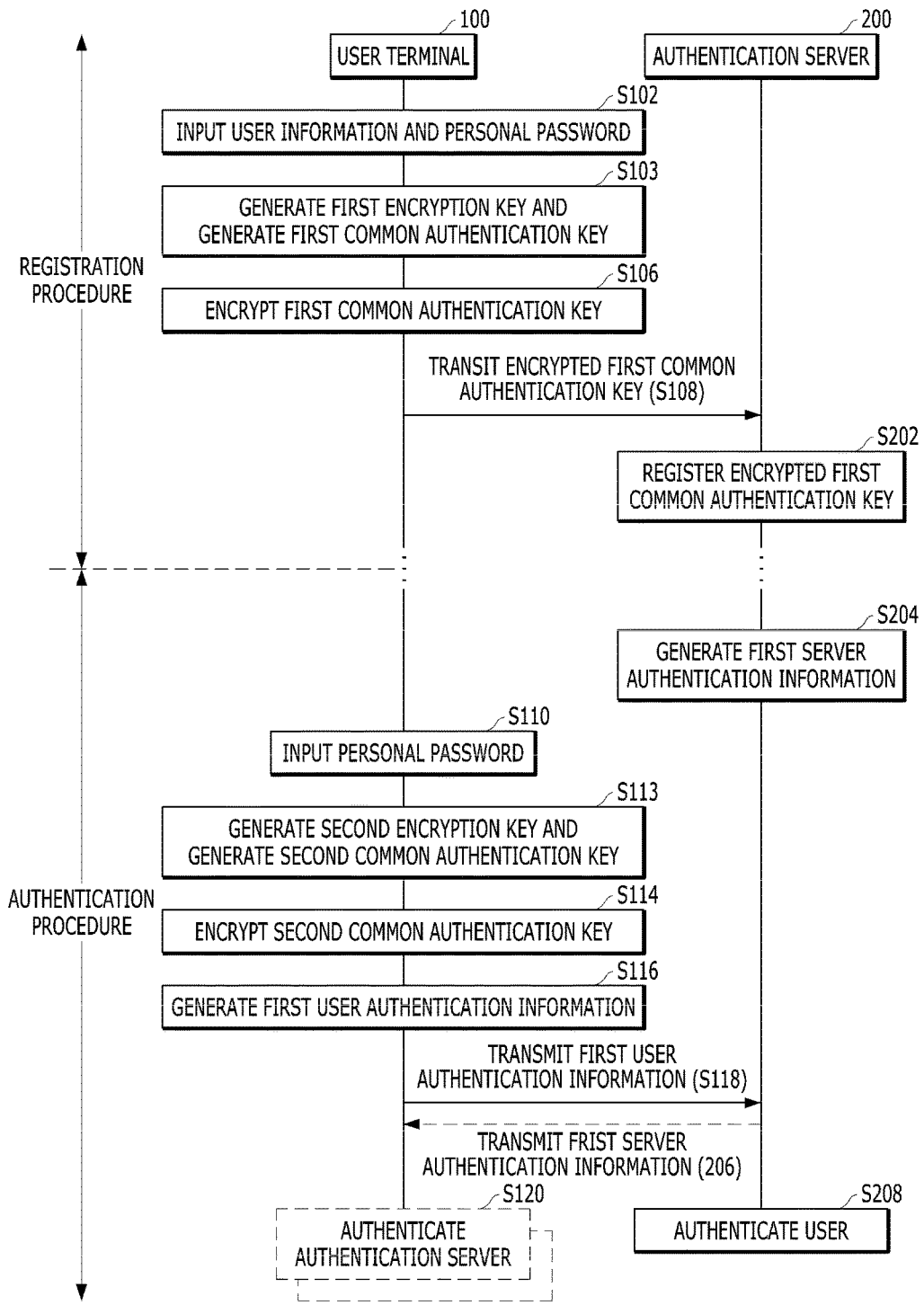
FIG. 12 is a flowchart illustrating a user authentication method according to a fourth embodiment of the inventive concept.
Figure 13:
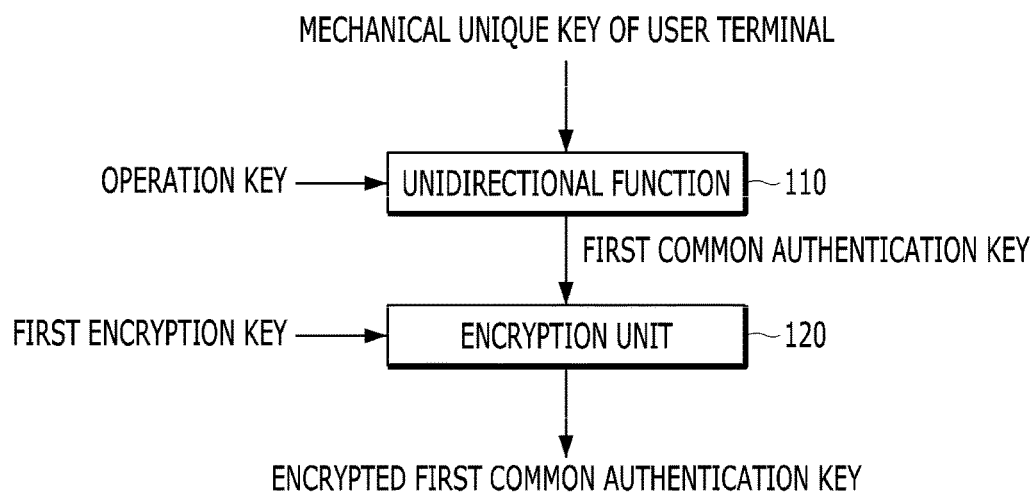
FIG. 13 is a block diagram illustrating a process of generating a first common authentication key and an encrypted first common authentication key in FIG. 12.

FIG. 12 is a flowchart illustrating a user authentication method according to a fourth embodiment of the inventive concept. FIG. 13 is a block diagram illustrating a process of generating a first common authentication key and an encrypted first common authentication key in FIG. 12.

As illustrated in FIGS. 12 to 13, the user authentication method according to the fourth embodiment of the inventive concept may be started by downloading and installing a dedicated app by the user so that a user terminal 100 may register a user. The user registration procedure may be performed in the process of installing the dedicated app, but also may be performed through a separate user registration process after the dedicated app is installed.

First, if a procedure for registration of a user is started by the user and the user inputs user information and personal password through the user terminal 100 (S102), the user terminal 100 generates a first common authentication key and a first encryption key for encryption of the first common authentication key (S103). The first encryption key for encryption of the first common authentication key may be generated at random by a specific reference, and also may be generated through a separately selected element.

In the fourth embodiment of the inventive concept, it will be described that the first encryption key is generated while the personal password input by the user is taken as an element.

The first encryption key may be generated by performing a conversion using a unidirectional function while the personal password input by the user is taken as an element. A value generated by a specific reference may be used as the operation key of the unidirectional function.

The unidirectional function is a function of mapping and converting data of an arbitrary length to data of a fixed length, and may refer to all functions known as being able to make it impossible to perform an inverse transformation, that is, to restore original data. The unidirectional function may include all unidirectional functions, including a cryptologic hash function, such MD5, SHA, SHA2, or scrypt and a no-cryptologic hash function such as CRC32 or CHECHSUM, which are known to those skilled in the art, and the first encryption key may be generated by using any one unidirectional function selected from the unidirectional functions.

In addition to the personal password, the mechanical unique key of the user terminal may be added as an element for generating the first encryption key, and here a unique key (e.g., Device Token, Bundle ID, Package Name, or App ID) may be included as an element. Further, another element may be added.

Here, the mechanical unique key of the user terminal 100, for example, may include a serial number or a USIM number, and also may include various unique numbers or phone numbers that are given to classify user terminals.

As illustrated in FIG. 13, before and after the generation of the first encryption key, or at the same time when the first encryption key is generated, a primary conversion using the unidirectional function 110 is performed by using the mechanical unique key of the user terminal 100 to generate a first common authentication key (S103). A value generated by a specific reference may be used as the operation key of the unidirectional function 110.

The first common authentication key may be generated through a primary conversion using the unidirectional function 110 while the mechanical unique key of the user terminal 100 is taken as a single element. Another element may be added to the first common authentication key. For example, a unique key (e.g. a device token, a bundle ID, a package name, or an app ID) of the dedicated app may be further included as an element. Further, another element, of which the uniqueness is admitted, may be added.

In the first to third embodiments of the inventive concept, the personal password input by the user is an element for generating the first common authentication key, but in the fourth embodiment of the inventive concept, the personal password is an element for generating the first encryption key, and is not used as an element of the first common authentication key.

This scheme is to enhance security on an open network while blocking any attempt to leak personal information.

Thereafter, the first common authentication key is converted to an encrypted first common authentication key through a secondary conversion of encrypting the first common authentication key through an encryption unit 120 (S106).

Here, the encryption may be made by using a symmetrical scheme in which an encryption key for encryption and a decryption key for decryption, and an encryption scheme, which is selected from Twofish, Serpent, AES, Blowfish, CAST5, RC4, 3DES, IDEA, RC6, and DES, may be used. In addition, an encryption scheme, which is well known to those skilled in the art, may be applied.

The user terminal 100 may transmit the encrypted first common encryption key to the authentication server 200, together with the user information (S108).

The authentication server 200 matches the encrypted first common encryption key, which has been transmitted from the user terminal 100, with the user information and the encrypted first common authentication key is registered and stored in the authentication server 200 together with the user information (S202). Accordingly, a user registration procedure is performed. If the user registration procedure is performed, the user terminal 100 may delete the encrypted first common authentication key and the first encryption key. According to occasions, the encrypted first common authentication key and the first encryption key may be stored in a dedicated storage space set by the user terminal 100 or a dedicated storage space set by the dedicated app in the user terminal 100.

According to the related art, an authentication server stores a personal password if a user registration is performed, but in the fourth embodiments of the inventive concept, neither the authentication server 200 nor the user terminal 100 stores a password, and the authentication server 200 stores only the encrypted first common authentication key.

Accordingly, when the user forgets or leaks a personal password, the personal password may be encrypted again through a first encryption key including a new password through a new registration procedure so that an encrypted first common authentication key is transmitted to and registered in the authentication server 200, and the security of the authentication institute is enhanced even when the encrypted first common authentication key is leaked, for example, through hacking.

Further, the personal password is not taken as an element of the first common authentication key, and leakage of personal information may be prevented through a primary conversion using a unidirectional function and a secondary conversion of encryption, and a user authentication or an authentication of an authentication server may be possible safely without a concern of hacking in an open network environment.

Thereafter, the authentication server 200 may generate first server authentication information by combining an embedded unique key of an authentication institute and the encrypted first common authentication key (S204).

The first server authentication information may be generated in the two schemes described with reference to FIGS. 4A and 4B as in the first embodiment of the inventive concept.

As illustrated in FIG. 4A, according to one scheme, the authentication server 200 generates a first server authentication key through a conversion by using the unidirectional function 210 while the embedded unique key of the authentication institute and the encrypted first common authentication key are taken as elements, and may generate first server authentication information that is synchronized to a time value, by performing an OTP operation on the first server authentication key. Here, the first server authentication key may be generated by performing a conversion using the unidirectional function 210 on the encrypted first common authentication key while the unique key of the authentication institute is taken as an operation key. Further, the first server authentication information may be generated through an OTP operation using an OTP generator 230.

As illustrated in FIG. 4B, according to another scheme, the authentication server 200 generates a first server authentication key through a conversion by using the unidirectional function 210 while the embedded unique key of the authentication institute and the encrypted first common authentication key are taken as elements, and may generate a second sever authentication key that is extracted from the first server authentication key by a specific reference by using time information.

The second server authentication key may be extracted through a separate time extraction value generator 220 to be generated, and the second server authentication key may mean an arbitrary synchronous value generated by the first server authentication key. The operation principle of the time extraction value generator 220 is the same as that of a general OTP generator, and the general OTP generator may display an output value with a number but, in contrast, the time extraction value generator 220 displays an output value with an number, a letter, or other various symbols. Accordingly, it should be understood that the time extraction value generator 220 includes an OTP generator that performs a general OTP operation.

Thereafter, the authentication server 200 may generates the first server authentication information by performing an OTP operation through the OTP generator 230 on the second server authentication key.

The first server authentication information may be independently generated regardless of other procedures after the registration of the user. That is, it is satisfactory as long as the first server authentication information is generated from the registration of the user to a time point when the first user authentication information, which will be described below, is generated.

Further, even when the first server authentication information is transmitted to the user terminal 100, it may be transmitted immediately after it is generated but also may be transmitted at a necessary time point. Further, it may be transmitted in response to a request of the user terminal 100.

Thereafter, if an authentication procedure is started by the user and a procedure for authentication from the user is started by the user terminal 100, and the user inputs a personal password (S110), the user terminal 100 generates a second common authentication key and a second encryption key (S113). The second common authentication key is an element corresponding to the first common authentication key, and the second encryption key is an element corresponding to the first encryption key. Accordingly, the generation schemes have to correspond to each other. The second encryption key for encryption of the second common authentication key may be generated at random by a specific reference, and also may be generated through a separately selected element.

Here, the second encryption key is generated while the personal password is taken as an element. The second encryption key may be generated by performing a conversion using a unidirectional function while the personal password input by the user is taken as an element. A value generated by a specific reference may be used as the operation key of the unidirectional function.

In addition to the personal password, the mechanical unique key of the user terminal 100 may be added as an element for generating the second encryption key, and here a unique key (e.g., Device Token, Bundle ID, Package Name, or App ID) of a dedicated app may be included as an element. Further, another element may be added. Here, the mechanical unique key of the user terminal 100, for example, may include a serial number or a USIM number, and also may include various unique numbers or phone numbers that are given to classify user terminals.

Before and after the generation of the first encryption key, or at the same time when the first encryption key is generated, a primary conversion using the unidirectional function 110 is performed by using the mechanical unique key of the user terminal 100 to generate a first common authentication key (S103). A value generated by a specific reference may be used as the operation key of the unidirectional function.

As in the generation scheme of the first common authentication key, the second common authentication key may be generated through a primary conversion using the unidirectional function 110 while the mechanical unique key of the user terminal 100 is taken as a single element, but other elements may be added. For example, a unique key (e.g. a device token, a bundle ID, a package name, or an app ID) of the dedicated app may be further included as an element. Further, another element, of which the uniqueness is admitted, may be added. This scheme may be possible in response to a case in which the unique key of the dedicated app is included in the first common authentication key as another element.

In the first to third embodiments of the inventive concept, the personal password input by the user is an element for generating the second common authentication key, but in the fourth embodiment of the inventive concept, the personal password is an element for generating the second encryption key, and is not used as an element of the second common authentication key.

That is, the second common authentication key is generated by combining the personal password and the mechanical unique key of the user terminal 100 and performing a primary conversion using the unidirectional function 110 (S113).

The unidirectional function 110 may be the same function as the unidirectional function that has generated the first common authentication key, and may be applied in the same manner.

Similarly to the scheme of generating the first common authentication key, the second common authentication key may be generated by performing a calculation through a calculation key generated by a specific reference while the personal password and the mechanical unique key of the user terminal 100 are taken as elements and primarily converting the calculated value.

Thereafter, similarly to the case of the first common authentication key, the second common authentication key is converted to an encrypted second common authentication key through a secondary conversion of encrypting the second common authentication key through the encryption unit 120 (S113). The encryption scheme and the generation scheme of the second encryption key correspond to the encryption scheme of the first common authentication key and the generation scheme of the first encryption key.

Here, the second encryption key is generated while the personal password is taken as an element. The second encryption key may be generated by performing a conversion using a unidirectional function while the personal password input by the user is taken as an element. A value generated by a specific reference may be used as the operation key of the unidirectional function.

In addition to the personal password, the mechanical unique key of the user terminal 100 may be added as an element for generating the second encryption key, and here a unique key ( ) (e.g., Device Token, Bundle ID, Package Name, or App ID) of the dedicated app may be included as an element. Further, another element may be added. Here, the mechanical unique key of the user terminal 100, for example, may include a serial number or a USIM number, and also may include various unique numbers or phone numbers that are given to classify user terminals.

The second encryption key may be stored in a dedicated storage space set by the user terminal 100 or a dedicated storage space set by the dedicated app in the user terminal 100.

Here, the second encryption key may be encrypted by a separate encryption scheme and may be stored. For example, the second encryption key may be stored after the encryption by using a third encryption key that is obtained by combining the personal password and the mechanical unique key of the user terminal and performing a conversion using a unidirectional function.

Thereafter, the user terminal 100 generates first user authentication information by using the encrypted second common authentication key (S116). The generation of the first server authentication information corresponding to the first user authentication information has been described already.

The first user authentication information may be generated in two schemes as in the first embodiment of the inventive concept.

As illustrated in FIG. 4A, according to one scheme, the authentication server 200 generates a first user authentication key through a conversion by using the unidirectional function 110 while a unique key of the authentication institute, which has been provided already, and the encrypted second common authentication key are taken as elements, and may generate first user authentication information that is synchronized to a time value, by performing an OTP operation on the first user authentication key. The unique key of the authentication institute may be embedded when the dedicated app is installed, or may be provided through an update before initiation of an authentication procedure.

Here, the first user authentication key may be generated by performing a conversion using the unidirectional function 110 on the encrypted second common authentication key while the unique key of the authentication institute is taken as an operation key. Further, the first user authentication information may be generated through an OTP operation using an OTP generator 130.

As illustrated in FIG. 4B, according to another scheme, the authentication server 200 generates a first user authentication key through a conversion by using the unidirectional function 110 while a unique key of the authentication institute, which has been provided already, and the encrypted second common authentication key are taken as elements, and may generate a second user authentication key that is extracted from the first user authentication key by a specific reference by using time information. The unique key of the authentication institute may be embedded when the dedicated app is installed, or may be provided through an update before initiation of an authentication procedure.

The second user authentication key may be extracted through a separate time extraction value generator 120 to be generated, and the second user authentication key may mean an arbitrary synchronous value generated by the first user authentication key. The operation principle of the time extraction value generator 120 is the same as that of a general OTP generator, and the general OTP generator may display an output value with a number but, in contrast, the time extraction value generator 120 displays an output value with an number, a letter, or other various symbols. Accordingly, it should be understood that the time extraction value generator 120 includes an OTP generator that performs a general OTP operation.

Thereafter, the user terminal 100 may generate the first user authentication information by performing an OTP operation through the OTP generator 130, on the second user authentication key.

Here, the scheme of generating the first user authentication information should be identical with the scheme of generating the first server authentication information. If the first server authentication information is generated through the scheme described through FIG. 4A, the first user authentication information also has to be generated in the scheme described through FIG. 5A. Further, the unidirectional functions or the OTP operations thereof have to correspond to each other. Further, if the first server authentication information is generated through the scheme described through FIG. 4B, the first user authentication information also has to be generated in the scheme described through FIG. 5B. Further, the unidirectional functions, the OTP operations, the time value extractions, and the like have to correspond to each other in the same scheme.

Thereafter, if the first user authentication information is transmitted to the authentication server 200 through the user terminal 100 (S118), the authentication server 200 performs a user authentication based on coincidence of the authentication information, that is, whether the first user authentication information and the first server authentication information coincide with each other (S208). The first user authentication information may be manually input and then be transmitted from the user, may be automatically transmitted, and may be automatically transmitted from a transmission instruction of the user.

Here, the user terminal 100 may include one or a plurality of user terminals that are connected to the authentication server 200. For example, a registration procedure of, for example, a first common authentication key, may be progressed by the first user terminal 100 and an authentication procedure may be progressed by the second user terminal 100, and an opposite case may be possible. Further, even in the authentication procedure, the first user authentication information may be generated by the first user terminal 100, and may be input or transmitted from the second user terminal 100. In addition, a plurality of user terminals 100 may be used in various procedures.

Further, the user may compare the first user authentication information and the first server authentication information through the user terminal 100 to identify the genuineness of the authentication server 200, the genuineness of an accessed webpage connected with the authentication server 200, or the genuineness of a service provider or an authentication institute that provides an authentication service. According to the related art, it is true that an accessed webpage of an authentication institute is forfeited so that the users are often confused, but there is no suitable measure. According to the inventive concept, it is possible for a user to identify the genuineness of an authentication institute (or a server provider) to solve the problem.

To achieve this, when the first server authentication information is generated, the authentication server 200 allows the first server authentication information to be displayed through the accessed webpage or to be transmitted to the user terminal 100 (S206). if the first server authentication information is displayed or transmitted, an authentication server 200 may be authenticated by allowing the user terminal to compare the first server authentication information and the first user authentication information to determine whether the authentication server 200 is a genuine server or the accessed webpage is genuine (S120). That is, it may be identified whether the authentication server 200 is genuine, whether the accessed webpage connected with the authentication server 200, or whether the service provider or the authentication institute that provides an authentication server is genuide.

Here, when the first server authentication information is transmitted to the user terminal 100 in advance before the encrypted second common authentication key is generated, the authentication server 200 is authenticated by using the first server authentication information that has been transmitted in advance without the first server authentication information is retransmitted or separately transmitted.

In the fourth embodiment of the inventive concept, if the first server authentication information and the first user authentication information are compared by the user terminal 100, the authentication institute or the authentication server 200 may be authenticated, through identification of the coincidence of the first server authentication information and the first user authentication information, by determining whether the authentication institute or the authentication server 200 is genuine, and if the first server authentication information and the first user authentication information are compared by the authentication server 200, the user may be authenticated through the identification of the first server authentication information and the first user authentication information.

Here, the authentication procedures (S206 and S120) of the authentication server 200 and the user authentication procedures (S118 and S208) may be performed at the same time, and if the authentication is performed after the authentication procedure of the authentication server is performed first, the user authentication procedure is performed, and any one of the authentication procedure of the authentication server and the user authentication procedure may be selectively performed.

In the fourth embodiment of the inventive concept, all data that is transmitted between the user terminal 100 and the authentication server 200 may be encrypted in a public key scheme and be transmitted.

In the fourth embodiment of the inventive concept, when not the authentication server but the user is authenticated, if several user terminals 100 or the user authentication is performed by using a mobile terminal, a desktop PC, a table, and the like are used at the same time, a plurality of first user authentication information may be transmitted to the authentication server 200 in a specific time by an abnormality or an error even in the case of hacking.

In this case, for a robust authentication, even when the first user authentication information is transmitted, the authentication server 200 may request retransmission of the first user authentication information from the user terminal 100 and may request the retransmission of the first user authentication information not automatically but through a manual input. Then, the first user authentication information has to be displayed on a screen of the user terminal such that the user may perform a manual input. Here, it may be requested to perform the manual input continuously two times. If the first user authentication information is transmitted through a manual input, the authentication server 200 may compare the first user authentication information transmitted through the manual input to perform a user authentication.

Further, when a symptom of an attack, such as hacking, occurs in an authentication process, for example, a loading time is significantly slower than in normal time, that is, when a symptom of an attack, such as hacking, which is well known to those skilled in the art, including the case when promised values displayed on the screen of the desktop PC and the mobile terminal are different after a user logs in the desktop PC, the user terminal 100 may automatically or manually transmit a compulsory stop signal, by which an authentication procedure may be compulsorily stopped, to the authentication server 200. If the compulsory stop signal is transmitted to the authentication server 200, the user terminal 100 and the authentication server 200 stop the authentication procedure and wait until a new authentication procedure is started.

As another example, when the symptom of an attack is detected, the authentication server 200 may determine presence of an attack, may transmit a signal to ask about whether the authentication procedure is to be stopped, may determine whether the authentication procedure is to be stopped, in response to a response signal of the user terminal 100.

Meanwhile, a verification key for verifying integrity of data may be added to all transmission target data including authentication information and authentication keys, which are transmitted between the user terminal 100 and the authentication server 200. That is, the verification key may be added to the transmission target data to be transmitted. The verification key may include a first OTP operation value, which was obtained by performing OTP operations on the transmission target data.

Further, when the user terminal 100 or the authentication server 200 receives the data, the integrity of the authentication may be verified by comparing a second OTP operation value, which was obtained by performing OTP operations on the received data, and the verification key.

For example, when the user terminal 100 transmits the first user authentication information to the authentication server 200, a first OTP operation value, which was obtained by performing an OTP operation on the first user authentication information, may be added to the first user authentication information and may be transmitted. In this case, when the authentication server 200 receives the first user authentication information, the integrity of the first user authentication information may be verified by comparing a second OTP operation value, which was obtained by performing an OTP operation on the first user authentication information, from which the verification key was separated, and the verification key.

In the fourth embodiments of the inventive concept, when the authentication server 200 is authenticated by comparing the first user authentication information and the first server authentication information, an additional user authentication procedure is necessary. Further, when the authentication server 200 performs a user authentication by comparing the first user authentication information and the first server authentication information, an additional user authentication may be necessary to secure an additional reliability. To achieve this, a fifth embodiment of the inventive concept, which will be described below, is necessary.

Hereinafter, the fifth embodiment of the inventive concept will be described.

Figure 14:
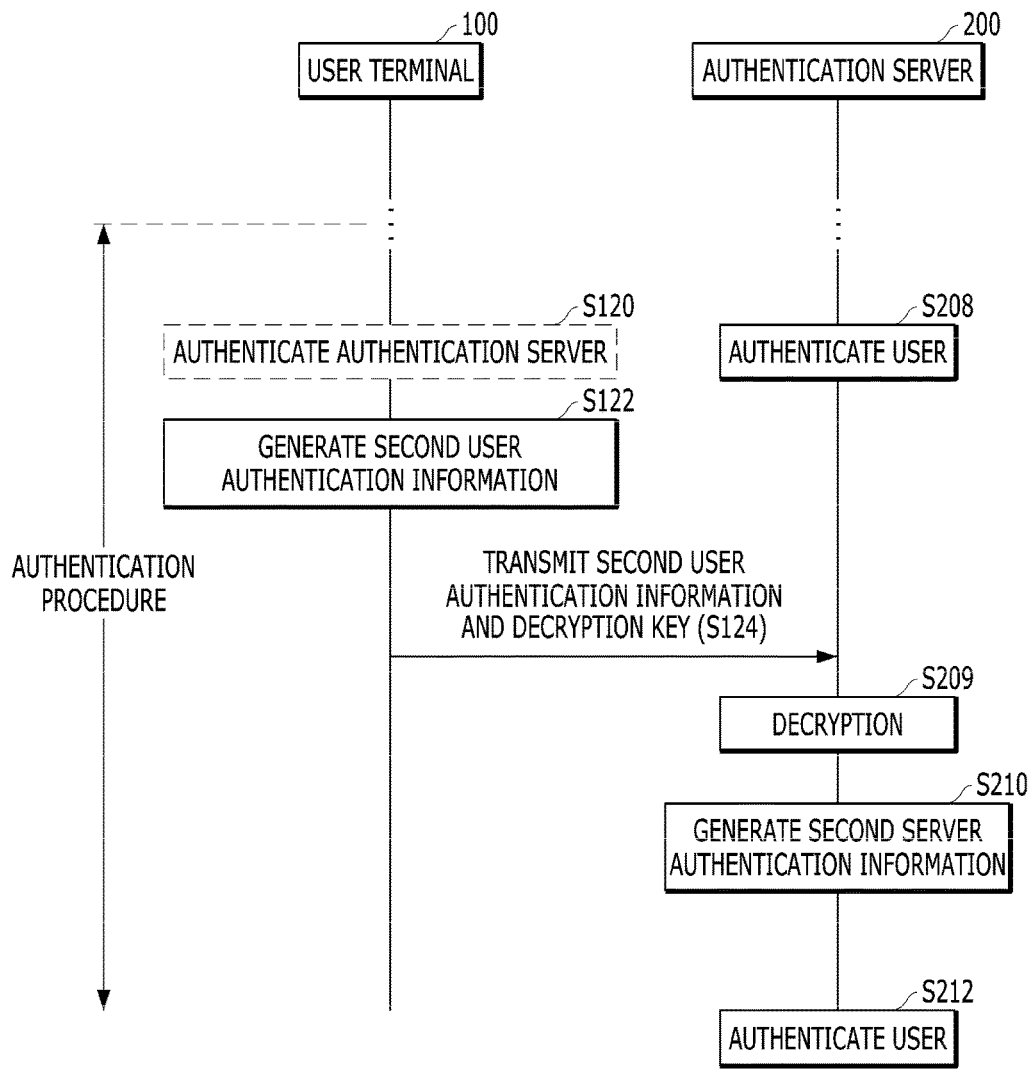
FIG. 14 is a flowchart illustrating a user authentication method according to a fifth embodiment of the inventive concept.

FIG. 14 is a flowchart illustrating a user authentication method according to a fifth embodiment of the inventive concept.

As illustrated in FIG. 14, the user authentication method according to the fifth embodiment of the inventive concept includes all of the authentication procedures described in the fourth embodiment of the inventive concept, and may include a process, which is added while the user authentication (S208) and the authentication (S120) of the authentication server are performed through the first user authentication information and the first server authentication information. Accordingly, because the process of performing the user authentication (S208) and the authentication (S120) of the authentication server through the first user authentication information and the first server authentication information have been described in the fifth embodiment of the inventive concept, a detailed description thereof will be omitted.

Before the user authentication (S208) and the authentication (S120) of the authentication server are performed after the first server authentication information and the first user authentication information are generated, or after the user authentication (S208) and the authentication (S120) of the authentication server are performed through the first server authentication information and the first user authentication information, the user terminal 100 generates second user authentication information by using the first user authentication information or the first server authentication information and the second common authentication key (S122).

The elements for generating the second user authentication information generally include the first user authentication information and the second common authentication key, but may include the first server authentication information when the authentication server 200 transmits the first server authentication information. This may be possible with a premise that the first server authentication information and the first user authentication information have the same value. Hereinafter, a case of generating the second user authentication information by using the first user authentication information will be described.

Further, the second common authentication key may mean a second common authentication key that is obtained by decrypting the encrypted second common authentication key by using a decryption key, or a second common authentication key that is not encrypted. In the following, when there is no separate modifier in a second common authentication key, the second common authentication key may mean a decrypted second common authentication key or an unencrypted second common authentication key.

The second user authentication information may be generated in two schemes as in the second embodiment of the inventive concept.

As illustrated in FIG. 7A, according to one scheme, a third user authentication key may be generated through a conversion by using the unidirectional function 110 while the second common authentication key and the first user authentication information are taken as elements, and the second user authentication information that is synchronized to a time value may be generated by performing an OTP operation on the third user authentication key.

Here, the third user authentication key may be generated by performing a conversion using the unidirectional function 110 on the first user authentication information while the second common authentication key is taken as an operation key. Further, the second user authentication information may be generated through an OTP operation using an OTP generator 130.

According to another scheme, as illustrated in FIG. 7B, a third user authentication key is generated through a conversion using the unidirectional function 110 while the second common authentication key and the first user authentication information are taken as elements, and a fourth user authentication key that is extracted from the third user authentication key with a specific reference by using time information is generated.

The fourth user authentication key may be extracted through a separate time extraction value generator 120 to be generated, and the fourth user authentication key may mean an arbitrary synchronous value generated by the third user authentication key. The operation principle of the time extraction value generator 120 is the same as that of a general OTP generator, and the general OTP generator may display an output value with a number but, in contrast, the time extraction value generator 120 displays an output value with an number, a letter, or other various symbols. Accordingly, it should be understood that the time extraction value generator 120 includes an OTP generator that performs a general OTP operation.

Thereafter, the user terminal 100 may generate the second user authentication information, which has been synchronized to a time value, by performing an OTP operation through the OTP generator 130, on the fourth user authentication key.

If the second user authentication information is generated, the user terminal 100 provides the second user authentication information and the decryption key for decrypting the encrypted first common authentication key to the authentication server 200 (S124).

When a symmetrical key encryption scheme that is the same as the encryption key and the decryption key is used, the decryption key will be the first encryption key or the second encryption key.

The authentication server 200 decrypts the encrypted first common authentication key to a first common authentication key by using the decryption key provided by the user terminal 100 (S209). In the following, the term of a first common authentication key that has no separate modifier may mean a first common authentication key.

Further, second server authentication information is generated by using the first common authentication key and the first server authentication information (S210). Here, when the first user authentication information is transmitted from the user terminal 100, the first user authentication information is used instead of the first server authentication information, which is the same as in the case of generating the second user authentication information.

The second server authentication information may be generated in two schemes as in the second embodiment of the inventive concept.

As illustrated in FIG. 8A, according to one scheme, the authentication server 200 generates a third server authentication key through a conversion by using the unidirectional function 210 while the first server authentication information and the first common authentication key are taken as elements, and may generate a second sever authentication information that is synchronized to a time value, by performing an OTP operation on the third server authentication key. Here, the third server authentication key may be generated by performing a conversion using the unidirectional function 210 on the first server authentication information while the first common authentication key is taken as an operation key. Further, the second server authentication information may be generated through an OTP operation on the third server authentication key by using an OTP generator 230.

As illustrated in FIG. 8B, according to another scheme, the authentication server 200 generates a third server authentication key through a conversion by using the unidirectional function 210 while the first server authentication information and the first common authentication key are taken as elements, and may generate a fourth sever authentication key that is extracted from the third server authentication key by a specific reference by using time information.

The fourth server authentication key may be extracted through a separate time extraction value generator 220 to be generated, and the fourth server authentication key may mean an arbitrary synchronous value generated by the third server authentication key. The operation principle of the time extraction value generator 220 is the same as that of a general OTP generator, and the general OTP generator may display an output value with a number but, in contrast, the time extraction value generator 220 displays an output value with an number, a letter, or other various symbols. Accordingly, it should be understood that the time extraction value generator 220 includes an OTP generator that performs a general OTP operation.

Thereafter, the authentication server 200 may generates the second server authentication information by performing an OTP operation through the OTP generator 230 on the fourth server authentication key.

Here, the scheme of generating the second user authentication information should be identical with the scheme of generating the second server authentication information. If the second server authentication information is generated through the scheme described through FIG. 8A, the second user authentication information also has to be generated in the scheme described through FIG. 7A. Further, the unidirectional functions or the OTP operations thereof have to correspond to each other. Further, if the second server authentication information is generated through the scheme described through FIG. 8B, the second user authentication information also has to be generated in the scheme described through FIG. 7B. Further, the unidirectional functions, the OTP operations, the time value extractions, and the like have to correspond to each other in the same scheme.

Thereafter, the authentication server 200 performs a user authentication, based on coincidence of the authentication information, that is, whether the second user authentication information and the second server authentication information coincide with each other (S212). The second user authentication information may be manually input and then be transmitted from the user, may be automatically transmitted, and may be automatically transmitted from a transmission instruction of the user.

Here, the user terminal 100 may include one or a plurality of user terminals that are connected to the authentication server 200. For example, a registration procedure of, for example, an encrypted first common authentication key, may be progressed by the first user terminal 100 and an authentication procedure may be progressed by the second user terminal 100, and an opposite case may be possible. Further, even in the authentication procedure, the first user authentication information or the second user authentication information may be generated by the first user terminal 100, and may be input or transmitted from the second user terminal 100. In addition, a plurality of user terminals 100 may be used in various procedures.

In the fifth embodiment of the inventive concept, all data that is transmitted between the user terminal 100 and the authentication server 200 may be encrypted in a public key scheme and be transmitted.

Further, in the fifth embodiment of the inventive concept, when the user is authenticated, if several user terminals 100 or the user authentication is performed by using a mobile terminal, a desktop PC, a table, and the like are used at the same time, a plurality of first user authentication information or first server authentication information may be transmitted in a specific time by an abnormality or an error.

In particular, an authentication server is authenticated by transmitting the first server authentication information to the user terminal 100 and a user is authenticated by transmitting the second user authentication information to the authentication server 200, a plurality of first server authentication information may be transmitted from the authentication server 200 to different user terminals 100 or the same user terminal 100 for a specific period of time (e.g., 30 seconds, 60 seconds, or the like).

In this case, for a robust authentication, even after the second user authentication information is transmitted, the authentication server 200 may request retransmission of the second user authentication information from the user terminal 100 and may request the retransmission of the first user authentication information not automatically but through a manual input. Then, the second user authentication information has to be displayed on a screen of the user terminal 100. If the second user authentication information is transmitted through a manual input in the user terminal 100, the authentication server 200 may compare the manually input second user authentication information and the second server authentication information to additionally perform a user authentication.

In order to increase the security of an authentication, an additional authentication through comparison of third user authentication information and third server authentication information may be made after an additional authentication through retransmission of the second user authentication information or in place of an additional authentication through retransmission of the second user authentication information.

The authentication server 200 requests the third user authentication information from the user terminal 100 after an additional authentication through retransmission of the second user authentication information or in place of an additional authentication through retransmission of the second user authentication information.

The third user authentication information and the third server authentication information may be generated by applying the same scheme as that of the second embodiment of the inventive concept.

That is, as illustrated in FIG. 9A, the user terminal 100 may perform a conversion using a unidirectional function 110 while a fourth user authentication key that is an element for generating the second user authentication information and the unique key of the authentication institute are taken as elements to generate a fifth user authentication key, and perform an OTP operation on the fifth user authentication key to generate the third user authentication information.

Then, the authentication server 200 generates third server authentication information corresponding to the third user authentication information.

As illustrated in FIG. 9B, the user terminal 200 may perform a conversion using a unidirectional function 210 while a fourth server authentication key that is an element for generating the second server authentication information and the unique key of the authentication institute are taken as elements to generate a fifth server authentication key, and perform an OTP operation on the fifth server authentication key to generate the third server authentication information.

Thereafter, if the third user authentication information is transmitted to the authentication server 200, the authentication server 200 may determine whether the third user authentication information and the third server authentication information coincide with each other to perform an additional user authentication.

Meanwhile, when a symptom of an attack, such as hacking, occurs in an authentication process, for example, a loading time is significantly slower than in normal time, that is, when a symptom of an attack, such as hacking, which is well known to those skilled in the art, including the case when promised values displayed on the screen of the desktop PC and the mobile terminal are different after a user logs in the desktop PC, the user terminal 100 may automatically or manually transmit a compulsory stop signal, by which an authentication procedure may be compulsorily stopped, to the authentication server 200. If the compulsory stop signal is transmitted to the authentication server 200, the user terminal 100 and the authentication server 200 stop the authentication procedure and wait until a new authentication procedure is started.

As another example, when the symptom of an attack is detected, the authentication server 200 may determine presence of an attack, may transmit a signal to ask about whether the authentication procedure is to be stopped, may determine whether the authentication procedure is to be stopped, in response to a response signal of the user terminal 100.

Meanwhile, a verification key for verifying integrity of data may be added to all transmission target data including authentication information and authentication keys, which are transmitted between the user terminal 100 and the authentication server 200. That is, the verification key may be added to the transmission target data to be transmitted. The verification key may include a first OTP operation value, which was obtained by performing OTP operations on the transmission target data.

Further, when the user terminal 100 or the authentication server 200 receives the data, the integrity of the authentication may be verified by comparing a second OTP operation value, which was obtained by performing OTP operations on the received data, and the verification key.

For example, when the user terminal 100 transmits the first user authentication information or the second user authentication information to the authentication server 200, a first OTP operation value, which was obtained by performing a first OTP operation on the first user authentication information or the second user authentication information, may be added to the second user authentication information and may be transmitted. In this case, when the authentication server 200 receives the first user authentication information or the second user authentication information, the integrity of the first user authentication information or the second user authentication information may be verified by comparing a second OTP operation value, which was obtained by performing an OTP operation on the first user authentication information or the second user authentication information, from which the verification key was separated, and the verification key.

The fifth embodiment of the inventive concept has an enhanced security and an enhanced integrity. Here, an element of a gap time value or a gap time key may be added to enhance the security of the authentication procedure. Hereinafter, the sixth embodiment of the inventive concept will be described.

The sixth embodiment of the inventive concept has the same configuration as that of the fifth embodiment of the inventive concept, except that the gap time value or the gap time key described through the third embodiment of the inventive concept is added as an element when the second user authentication information and the second server authentication information are generated in the fifth embodiment of the inventive concept. Accordingly, the sixth embodiment of the inventive concept may be carried out through the fifth embodiment and the third embodiment of the inventive concept, and a detailed description thereof will be omitted.

As described above, according to the inventive concept, the security of an authentication may be enhanced and the integrity of transmission data may be verified, by blocking any attempt to leak personal information on an open network and by preventing hacking to enhance security, and verifying integrity of transmission data. Further, a genuineness of an authentication server, an authentication institute, and a website for authentication may be checked, and an authentication of a user for integrity and unity may be possible. Further, according to a chaining method for generating a next value by performing a unidirectional conversion by using a previous value when authentication information is generated, a manipulation of, for example, detecting a value, which will be generated in the future, through a time manipulation of a terminal may be basically prevented.

Because the embodiments have been exemplarily described with reference to the drawings for full understanding of the inventive concept, they have to be construed not to limit the inventive concept. Further, the inventive concept may be variously changed and modified by those skilled in the art to which the inventive concept pertains without departing from the basic principle of the inventive concept.

What is claimed is:

1. A user authentication method using a user terminal and an authentication server, the user authentication method comprising:
performing a first set of steps including:
receiving, by the user terminal, from a user, a user input of a user registration password;
combining, by the user terminal, the received registration password for the registration and a mechanical unique key of the user terminal;
performing, by the user terminal, a first conversion for the combined registration password and mechanical unique key, by using a unidirectional function;
generating, by the user terminal, a first common authentication key based on a result of the first conversion; of the registration, and
performing, by the user terminal, a second a secondary conversion for encrypting the first common authentication key by using an encryption key;
providing, by the user terminal, the encrypted first common authentication key to the authentication server;
matching, by the authentication server, the encrypted first common authentication key with user information; and
registering, by the authentication server, the encrypted first common authentication key matched with the user information;
performing a second set of steps including:
performing, by the authentication server, a third conversion by using the unidirectional function while taking an embedded unique key of an authentication institute and the encrypted first common authentication key as elements for the unidirectional function;
generating, by the authentication server, a first server authentication key based on a result of the third conversion;
performing, by the authentication server, a first OTP (One Time Password) operation on the first server authentication key or a second server authentication key that is a converted value of the first server authentication key; and
generating, by the authentication server, first server authentication information based on a result of the first OTP operation;
performing a third set of steps including:
receiving, by the user terminal, from the user, a user input of a user authentication password;
combining, by the user terminal, the received authentication password and the mechanical unique key of the user terminal;
performing, by the user terminal, a fourth conversion for the combined authentication password and mechanical unique key, by using the unidirectional function;
generating, by the user terminal, a second common authentication key in real time, based on a result of the fourth conversion;
performing, by the user terminal, a fifth conversion for encrypting the second common authentication key by using the encryption key;
generating, by the user terminal, an encrypted second common authentication key, based on a result of the fifth conversion;
performing, by the user terminal, a sixth conversion by using the unidirectional function while taking the embedded unique key of the authentication institute provided by the authentication server in advance and the encrypted second common authentication key as elements for the unidirectional function;
generating, by the user terminal, a first user authentication key based on a result of the sixth conversion;
performing, by the user terminal, a second OTP operation on the first user authentication key or a second user authentication key that is a converted value of the first user authentication key; and
generating, by the user terminal, first user authentication information, based on a result of the second OTP operation; and
performing a fourth set of steps including:
performing, by the authentication server, a user authentication, based on whether the first server authentication information and the first user authentication information are matched with each other, or
performing, by the user terminal, an authentication server authentication based on whether the first server authentication information and the first user authentication information are matched with each other.

2. The user authentication method of claim 1, wherein a unique key of a dedicated application program installed in the user terminal is added to the first common authentication key or the second common authentication key as an element of the first common authentication key or the second common authentication key.

3. The user authentication method of claim 1, wherein the fourth set includes:

comparing, by the user terminal, the first user authentication information and the first server authentication information transmitted from the authentication server and performing, by the user terminal, the authentication of the authentication server, or comparing, by the authentication server, the first server authentication information and the first user authentication information transmitted from the user terminal, and performing, by the authentication server, the user authentication.

4. The user authentication method of claim 1, wherein the second set includes:

performing, by the authentication server, the third conversion, using the unidirectional function while taking the embedded unique key of the authentication institute and the encrypted first common authentication key as elements for the unidirectional function;

generating, by the authentication server, the first server authentication key, based on the result of the third conversion;

generating, by the authentication server, the second server authentication key that is extracted from the first server authentication key through a time extraction value generator by using time information by a specific reference;

performing, by the authentication server, the first OTP operation on the second server authentication key; and generating, by the authentication server, the first server authentication information based on the result of the first OPT operation, and wherein the third set includes:

when the encrypted second common authentication key is generated, performing by the user terminal, the sixth conversion by using the unidirectional function while taking the embedded unique key of the authentication institute provided by the authentication server in advance and the encrypted second common authentication key as elements for the unidirectional function;

generating, by the user terminal, the first user authentication key based on the result of the sixth conversion of the authentication, by the user terminal;

generating, by the user terminal, the second user authentication key that is extracted from the first user authentication key through the time extraction value generator by using the time information by the specific reference;

performing, by the user terminal, the second OTP operation on the second user authentication key; and generating, by the user terminal, the first user authentication information based on the result of the second OTP operation.

5. The user authentication method of claim 1, further comprising between the third set and the fourth set, or after the fourth set:

performing, by the user terminal, a first additional conversion by using the unidirectional function while taking a second common authentication key decrypted by using a decryption key or an unencrypted second common authentication key, and the first server authentication information transmitted from the authentication server or the first user authentication information, elements for the unidirectional function;

generating, by the user terminal, a third user authentication key based on a result of the first additional conversion;

performing, by the user terminal, a first additional OTP operation on the third user authentication key;

generating, by the user terminal, a second user authentication information based on a result of the first additional OTP operation;

transmitting, by the user terminal, the second user authentication information and a decryption key to the authentication server;

decrypting, by the authentication server, the encrypted first common authentication key to the first common authentication key by using the decryption key;

performing, by the authentication server, a second additional conversion using the unidirectional function while taking the first common authentication key and the first user authentication information transmitted from the user terminal or the first server authentication information as elements for the unidirectional function;

generating, by the authentication server, a third server authentication key based on a result of the second additional conversion;

performing, by the authentication server, a second additional OTP operation for the third server authentication key; and generating, by the authentication server, a second server authentication information based on a result of the second additional OTP, and wherein the method further comprises, after the fourth set:

performing, by the authentication server, the user authentication based on whether the second user authentication information and the second server authentication information are matched with each other.

6. The user authentication method of claim 4, further comprising, between the third set and the fourth set, or after the fourth set:

performing, by the user terminal, a first additional conversion using the unidirectional function while taking one of a second common authentication key decrypted by using a decryption key and the unencrypted second common authentication key, and one of the first server authentication information transmitted from the authentication server or the first user authentication information as elements for the unidirectional function;

generating, by the user terminal, a third user authentication key based on a result of the first additional conversion;

generating, by the user terminal, a fourth user authentication key that is extracted from the third user authentication key through the time extraction value generator by using the time information by the specific reference;

performing, by the user terminal, a first additional OTP operation on the fourth user authentication key; and generating, by the user terminal, a second user authentication information based on the result of the first additional OTP operation, wherein the method further comprises:

transmitting, by the user terminal, the second user authentication information and the decryption key to the authentication server;

decrypting, by the authentication server, the encrypted first common authentication key to a first common authentication key by using the decryption key;

performing, by the authentication server, a second additional conversion using the unidirectional function while taking one of the first user authentication information transmitted from the user terminal and the first server authentication information and the first common authentication key as elements for the unidirectional function;

generating, by the authentication server, a third server authentication key based on a result of the second additional conversion;

generating, by the authentication server, a fourth server authentication key that is extracted from the third server authentication key through the time extraction value generator by the specific reference by using the time information;

performing, by the authentication server, a second additional OTP operation on the fourth server authentication key; and generating, by the authentication server, a second server authentication information based on a result of the second additional OTP operation, wherein the method further comprises: after the fourth set, performing, by the authentication server, a user authentication based on whether the second user authentication information and the second server authentication information are matched with each other.

7. The user authentication method of claim 5, wherein the third set further comprises:

measuring, by the user terminal, a gap time value that is a time value that is obtained by measuring a time consumed to input the user authentication password by the user in unit of 1/n (n is a positive real number) seconds; and transmitting, by the user terminal, the gap time value to the authentication server, wherein when the third user authentication key is generated by the user terminal, the user terminal adds the gap time value or a gap time key that is a number value extracted from the gap time value by a specific reference as an element of the generated third user authentication key, and wherein when the authentication server generates the third server authentication key, the user terminal adds the time gap value or the gap time key as the element of the generated third user authentication key.

8. The user authentication method of claim 6, wherein the third set further comprises:

measuring, by the user terminal, a gap time value that is a time value that is obtained by measuring a time consumed to input the user authentication password by the user in unit of 1/n (n is a positive real number) seconds; and transmitting, by the user terminal, the gap time value to the authentication server, wherein when the third user authentication key is generated by the user terminal, the user terminal adds the gap time value or a gap time key that is a number value extracted from the gap time value by a specific reference as an element of the generated third user authentication key, and wherein when the authentication server generates the third server authentication key, the user terminal adds the gap time value or the gap time key as an element of the generated third user authentication key.

9. The user authentication method of claim 5, wherein the unidirectional function comprises a hash function as a function for mapping data having an arbitrary length to data of a fixed length, and wherein a symmetrical key encryption scheme in which the encryption key used in the second conversion and the decryption key used in the first additional conversion are the same is used in the encryption and the decryption.

10. The user authentication method of claim 5, wherein a verification key for verifying integrity of data is added to transmission target data, the transmission target data is transmitted between user terminal and the authentication server and includes at least one of the first server authentication information, the second server authentication information, the first user authentication information, and the second user authentication information, wherein a first OTP operation value, which was obtained by performing OTP operations on the transmission target data, is added to the verification key, and wherein, when the user terminal or the authentication server receives the transmission target data, an integrity of the user authentication or the authentication server authentication is verified by comparing a second OTP operation value, which was obtained by performing OTP operations on the received transmission target data, and the verification key.

11. The user authentication method of claim 6, wherein the authentication server requests an additional manual input of the second user authentication information from the user terminal when a plurality of first server authentication information is transmitted in a specific time, compares the additional manual input with the second server authentication information, and performs the user authentication if the second user authentication information is matched with the additional transmitted through a manual input.

12. The user authentication method of claim 6, further comprising:

requesting, by the authentication server, third user authentication information to the user terminal; and if the third user authentication information is transmitted from the user terminal, performing, by the authentication server, the user authentication based on whether the third user authentication information and third server authentication information are matched with each other, wherein the third user authentication information is generated by:

performing, by the user terminal, a seventh conversion using the unidirectional function while taking the unique key of the authentication institute and the fourth user authentication key as elements for the unidirectional function;

generating a fifth user authentication key based on a result of the seventh conversion;

performing, by the user terminal, a third OTP operation on the fifth user authentication key, and wherein the third server authentication information is generated by:

performing, by the authentication server, an eighth conversion using the unidirectional function while taking the unique key of the authentication institute and the fourth server authentication key as elements for the unidirectional function;

generating a fifth server authentication key based on a result of the eighth conversion; and performing, by the authentication server, a fourth OTP operation on the fifth server authentication key.

13. The user authentication method of claim 5, wherein the user terminal detects a symptom of an attack comprising hacking while an authentication procedure of the first set to the fourth set to is performed, and when the symptom of the attack is detected, compulsorily stops the authentication procedure by:
  generating a compulsory stop signal for compulsorily stopping the authentication procedure; and
  transmitting the compulsory stop signal to the authentication server.

14. A user authentication method using a user terminal and an authentication server, the user authentication method comprising:
  performing a first set of steps including:
  receiving, by the user terminal, from a user, a user input for staring a user registration procedure;
  performing, by the user terminal, a first conversion by using a unidirectional function while taking a mechanical unique key of the user terminal as an element for the unidirectional function;
  generating, by the user terminal, a first common authentication key based on a result of the first conversion;
  performing, by the user terminal, a second conversion for encrypting the first common authentication key by using an encryption key;
  providing, by the user terminal, the encrypted first common authentication key to the authentication server;
  matching, by the authentication server, the encrypted first common authentication key with user information; and
  registering, by the authentication server, the encrypted first common authentication key matched with the user information;
  performing a second set of steps including:
  performing, by the authentication server, a third conversion using the unidirectional function while taking an embedded unique key of an authentication institute and the encrypted first common authentication key as elements for the unidirectional function;
  generating, by the authentication server, a first server authentication key based on a result of the third conversion;
  performing, by the authentication server, a first OTP operation on the first server authentication key or a second server authentication key that is a converted value of the first server authentication key; and
  generating, by the authentication server, first server authentication information based on a result of the first OTP operation;
  performing a third set of steps including:
  receiving, by the user terminal, from the user, a user input for staring a user authentication procedure;
  performing, by the user terminal, a fourth conversion by using the unidirectional function while taking the mechanical unique key of the user terminal as an element for the unidirectional function;
  generating, by the user terminal, a second common authentication key in real time based on a result of the fourth conversion;
  performing, by the user terminal, a fifth conversion for encrypting the second common authentication key by using the encryption key;
  generating, by the user terminal, an encrypted second common authentication key based on a result of the fifth conversion;
  performing, by the user terminal, a sixth conversion by using the unidirectional function while taking the embedded unique key of the authentication institute provided by the authentication server in advance and the encrypted second common authentication key as elements for the unidirectional function;
  generating, by the user terminal, a first user authentication key based on a result of the sixth conversion;
  performing a second OTP operation on the first user authentication key or a second user authentication key that is a converted value of the first user authentication key; and
  generating first user authentication information based on a result of the second OTP operation; and
  performing a fourth set of steps including:
  performing, by the authentication server, a user authentication, based on whether the first server authentication information and the first user authentication information are matched with each other; or
  performing, by the user terminal, an authentication server authentication based on whether the first server authentication information and the first user authentication information are matched with each other.

15. The user authentication method of claim 14, wherein a first encryption key for encrypting the first common authentication key and a second encryption key for encrypting the second common authentication key are generated by performing an encryption key conversion using the unidirectional function while taking the user registration a password as an element for the unidirectional function, or are generated at random.

16. The user authentication method of claim 15, wherein the first encryption key and the second encryption key are generated by:
  combining the user registration password and the mechanical unique key of the user terminal; and
  performing the encryption key conversion by using the unidirectional function, the mechanical unique key of the user terminal being added as an element of the first encryption key and the second encryption key.

17. The user authentication method of claim 16, wherein when the first common authentication key, the second common authentication key, the first encryption key, and the second encryption key are generated, a unique key of a dedicated application installed in the user terminal is added to at least one of the generated keys as an element for the unidirectional function.

18. The user authentication method of claim 15, wherein the second set comprises:
  performing, by the authentication server, the third conversion using the unidirectional function while taking the embedded unique key of the authentication institute and the encrypted first common authentication key as elements for the unidirectional function;
  generating, by the authentication server, the first server authentication key based on a result of the third conversion;
  generating, by the authentication server, the second server authentication key that is extracted from the first server authentication key through a time extraction value generator by using time information by a specific reference;
  performing, by the authentication server, the first OTP operation on the second server authentication key; and
  generating, by the authentication server, the first server authentication information based on a result of the first OTP operation, and
  wherein the third set comprises:
  if the encrypted second common authentication key is generated, performing, by the user terminal, the sixth conversion by using the unidirectional function while taking the unique key of the authentication institute provided by the authentication server in advance and the encrypted second common authentication key as elements for the unidirectional function;

generating, by the user terminal, the first user authentication key based on the result of the sixth conversion of the authentication;

generating, by the user terminal, the second user authentication key that is extracted from the first user authentication key through the time extraction value generator by using the time information by the specific reference;

performing, by the user terminal, the second OTP operation on the second user authentication key; and generating, by the user terminal, the first user authentication information based on a result of the second OTP operation.

19. The user authentication method of claim 15, further comprising, between the third set and the fourth set, or after the fourth set:

performing, by the user terminal, a first additional conversion by using the unidirectional function while taking a second common authentication key decrypted by using a decryption key or an unencrypted second common authentication key, and the first server authentication information transmitted from the authentication server or the first user authentication information as elements for the unidirectional function;

generating, by the user terminal, a third user authentication key based on a result of the first additional conversion;

performing, by the user terminal, a first additional OTP operation on the third user authentication key; and generating, by the user terminal, a second user authentication information based on a result of the first additional OTP operation;

wherein the method further comprises:

transmitting, by the user terminal, the second user authentication information and a decryption key to the authentication server;

decrypting, by the authentication server, the encrypted first common authentication key to the first common authentication key by using the decryption key;

performing, by the authentication server, a second additional conversion using the unidirectional function while taking the first common authentication key and the first user authentication information transmitted from the user terminal or the first server authentication information as elements for the unidirectional function;

generating, by the authentication server, a third server authentication key based on a result of the second additional conversion;

performing, by the authentication server, a second additional OTP operation for the third server authentication key; and generating, by the authentication server, a second server authentication information based on a result of the second additional OTP operation, and wherein the method further comprises, after the fourth set;

performing, by the authentication server, the user authentication based on whether the second user authentication information and the second server authentication information are matched with each other.

20. The user authentication method of claim 18, further comprising, between the third set and the fourth set, or after the fourth set:

performing, by the user terminal, a first additional conversion using the unidirectional function while taking one of a second common authentication key decrypted by using a decryption key and the unencrypted second common authentication key, and one of the first server authentication information transmitted from the authentication server or the first user authentication information as elements for the unidirectional function;

generating, by the user terminal, a third user authentication key based on a result of the first additional conversion;

generating, by the user terminal, a fourth user authentication key that is extracted from the third user authentication key through the time extraction value generator by using the time information by the specific reference; and performing, by the user terminal, a first additional OTP operation on the fourth user authentication key; and generating, by the user terminal, a second user authentication information based on the result of the first additional OTP operation, wherein the method further comprises:

transmitting, by the user terminal, the second user authentication information and the decryption key to the authentication server;

decrypting, by the authentication server, the encrypted first common authentication key to a first common authentication key by using the decryption key;

performing, by the authentication server, a second additional conversion using the unidirectional function while taking one of the first user authentication information transmitted from the user terminal and the first server authentication information and the first common authentication key as elements for the unidirectional function;

generating, by the authentication server, a third server authentication key based on a result of the second additional conversion;

generating, by the authentication server, a fourth server authentication key that is extracted from the third server authentication key through the time extraction value generator by the specific reference by using the time information;

performing, by the authentication server, a second additional OTP operation on the fourth server authentication key; and generating, by the authentication server, a second server authentication information based on a result of the second additional OTP operation, and wherein the method further comprises: after the fourth set, performing, by the authentication server, a user authentication based on whether the second user authentication information and the second server authentication information are matched with each other.

21. The user authentication method of claim 19, wherein the third set further comprises:

measuring, by the user terminal, a gap time value that is a time value that is obtained by measuring a time consumed to input the user authentication password by the user in unit of 1/n (n is a positive real number) seconds; and transmitting, by the user terminal, the gap time value to the authentication server, wherein when the third user authentication key is generated by the user terminal, the user terminal adds the gap time value or a gap time key that is a number value extracted from the gap time value by a specific reference as an element of the generated third user authentication key, and wherein, when the authentication server generates the third server authentication key, the user terminal adds the time gap value or the gap time key as an element of the generated third server authentication key.

22. The user authentication method of claim 20, wherein the third set further comprises:
measuring, by the user terminal, a gap time value that is a time value that is obtained by measuring a time consumed to input the user authentication password authentication by the user in unit of 1/n (n is a positive real number) seconds; and
transmitting, by the user terminal, the gap time value to the authentication server,
wherein when the third user authentication key is generated by the user terminal, the user terminal adds the gap time value or a gap time key that is a number value extracted from the gap time value by a specific reference as an element of the generated third user authentication key, and
wherein when the authentication server generates the third server authentication key, the user terminal adds the time gap value or the gap time key as an element of the generated third server authentication key.

23. The user authentication method of claim 14, wherein a verification key for verifying integrity of data is added to transmission target data, the transmission target data is transmitted between user terminal and the authentication server and includes at least one of the first server authentication information, the second server authentication information, the first user authentication information, and the second user authentication information,
wherein a first OTP operation value, which was obtained by performing OTP operations on the transmission target data, is added to the verification key, and
wherein, when the user terminal or the authentication server receives the transmission target data, an integrity of the user authentication or the authentication server authentication is verified by comparing a second OTP operation value, which was obtained by performing OTP operations on the received transmission target data, and the verification key.

24. The user authentication method of claim 20, wherein the authentication server requests an additional manual input of the second user authentication information from the user terminal when a plurality of first server authentication information is transmitted in a specific time,
compares the additional manual input with the second server authentication information, and
performs the user authentication if the second user authentication information is matched with the additional manual input.

25. The user authentication method of claim 20, further comprising:
requesting, by the authentication server, third user authentication information to the user terminal; and
if the third user authentication information is transmitted from the user terminal, performing, by the authentication server, the user authentication based on whether the third user authentication information and third server authentication information are matched with each other,
wherein the third user authentication information is generated by:
performing, by the user terminal, a seventh conversion using the unidirectional function while taking the unique key of the authentication institute and the fourth user authentication key as elements for the unidirectional function;
generating a fifth user authentication key based on a result of the seventh conversion;
performing, by the user terminal, a third OTP operation on the fifth user authentication, and
wherein the third server authentication information is generated by:
performing, by the authentication server, an eighth conversion using the unidirectional function while taking the unique key of the authentication institute and the fourth server authentication key as elements for the unidirectional function;
generating a fifth server authentication key based on a result of the eighth conversion; and
performing, by the authentication server, a fourth OTP operation on the fifth server authentication.

26. The user authentication method of claim 14, wherein the user terminal
detects a symptom of an attack comprising hacking while an authentication procedure of the first set to the fourth set is performed, and
when the symptom of the attack is detected, compulsorily stops the authentication procedure by:
generating a compulsory stop signal for compulsorily stopping the authentication procedure; and
transmitting the compulsory stop signal to the authentication server.

* * * * *